United States Patent
King et al.

(10) Patent No.: US 9,934,216 B2
(45) Date of Patent: Apr. 3, 2018

(54) SCHEMA VALIDATION FOR METADATA BUILDER

(71) Applicant: CA, Inc., Islandia, NY (US)

(72) Inventors: David Patrick King, Prague (CZ); James Michael Newman, Plano, TX (US)

(73) Assignee: CA, Inc., Islandia, NY (US)

( * ) Notice: Subject to any disclaimer, the term of this patent is extended or adjusted under 35 U.S.C. 154(b) by 404 days.

(21) Appl. No.: 14/223,440

(22) Filed: Mar. 24, 2014

(65) Prior Publication Data

US 2015/0269193 A1 Sep. 24, 2015

(51) Int. Cl.
G06F 17/30 (2006.01)
G06F 17/27 (2006.01)
G06F 9/445 (2018.01)

(52) U.S. Cl.
CPC ...... *G06F 17/2725* (2013.01); *G06F 9/44578* (2013.01); *G06F 17/272* (2013.01)

(58) Field of Classification Search
CPC .... G06F 17/30; G06F 17/2725; G06F 17/272; G06F 9/44578
See application file for complete search history.

(56) References Cited

U.S. PATENT DOCUMENTS

| | | | |
|---|---|---|---|
| 6,714,979 B1 | 3/2004 | Brandt et al. | |
| 7,533,077 B2* | 5/2009 | Wang | G06F 9/50 |
| 8,793,223 B1 | 7/2014 | Cho et al. | |
| 2002/0049738 A1 | 4/2002 | Epstein | |
| 2003/0061209 A1 | 3/2003 | Raboczi et al. | |
| 2004/0064825 A1 | 4/2004 | Lim et al. | |
| 2005/0257210 A1 | 11/2005 | Stienhans et al. | |
| 2006/0248123 A1* | 11/2006 | Butash | G06F 11/0751 |
| 2007/0156726 A1 | 7/2007 | Levy | |
| 2008/0195651 A1 | 8/2008 | Rachmiel et al. | |
| 2008/0270992 A1* | 10/2008 | Georgieva | G06F 8/60 717/127 |
| 2009/0083295 A1 | 3/2009 | Minamino et al. | |
| 2009/0319365 A1 | 12/2009 | Waggoner et al. | |
| 2010/0180195 A1* | 7/2010 | Behrens | G06F 15/7842 715/234 |
| 2011/0179110 A1 | 7/2011 | Soloway | |
| 2012/0089610 A1 | 4/2012 | Agrawal et al. | |
| 2013/0185657 A1 | 7/2013 | Gunawardena et al. | |
| 2013/0212116 A1 | 8/2013 | Filliettaz, III | |

(Continued)

OTHER PUBLICATIONS

JAXB and Marshal/Unmarshal Schema Validation written by Blaise Doughan, Dec. 20, 2010, http://blog.bdoughan.com/2010/12/jaxb-and-marshalunmarshal-schema.html.*

(Continued)

*Primary Examiner* — Robert Beausoliel, Jr.
*Assistant Examiner* — Hau H Hoang
(74) *Attorney, Agent, or Firm* — Sage Patent Group

(57) ABSTRACT

Metadata is validated against a metadata schema by semantically validating metadata objects in metadata for a computer program, to confirm that required relationships among the metadata objects are present and conform to predefined rules. The metadata objects in the metadata for the computer program are also syntactically validated against a metadata schema for the metadata. Related methods, systems and computer programs are described.

16 Claims, 16 Drawing Sheets

(56) References Cited

U.S. PATENT DOCUMENTS

2015/0149876 A1   5/2015   Davis et al.

OTHER PUBLICATIONS

ArcGIS, "About validating metadata", downloaded Feb. 4, 2014 from http://help.arcgis.com/en/arcgisdesktop/10.0/help/index.html, 2 pp.
ArcGIS, "Validate Metadata (Conversion)", downloaded Feb. 4, 2014 from http://help.arcgis.com/en%20/arcgisdesktop/10.0/help/index.html, 3 pp.
ArcGIS, "Validating metadata" downloaded Feb. 4, 2014 from http://help.arcgis.com/en/arcgisdesktop/10.0/help/index.html, 3 pp.
CA Technologies, "CA Chorus™ Software Manager", downloaded Oct. 29, 2013 from http://www.ca.com/us/products/detail/ca-mainframe-software-manager.aspx, 5 pp.
CA Technologies, Product Brief—"CA Chorus™ Software Manager Release 5.1", copyright 2013, 10 pp.
Wikipedia, the free encyclopedia, "Marshalling", downloaded Feb. 4, 2014 from http://en.wikipedia.org/w/index.php?title=Marshalling_(computer_science)&printable=yes, 2 pp.
Wikipedia, the free encyclopedia, "Metadata", downloaded Jan. 29, 2014 from http://en.wikipedia.org/w/index.php?title=Metadata&printable=yes, 12 pp.

* cited by examiner

SCHEMA VALIDATION FOR METADATA BUILDER

BACKGROUND

Various embodiments described herein relate to computer systems, methods and programs, and more particularly to systems, methods and computer programs that provide metadata for a computer program.

Metadata is "data about data". In the context a computer program, metadata may be used to describe the content of the computer program using a given metadata standard.

Metadata itself is data that can be stored and managed in a database, often called a "metadata registry" or "metadata repository". Metadata is generally structured according to a standardized context using a well defined metadata schema. The metadata schema may contain the rules created to structure the fields or elements of metadata. The metadata schema may be expressed in a mark-up or programming language, such as Extensible Markup Language (XML). Metadata schema can be hierarchical in nature, where relationships exist between metadata elements, and elements are nested so that parent-child relationships exist between the elements. Thus, metadata may be expressed in a hierarchical object-oriented structure.

As the complexity of computer programs increase, the complexity of the metadata thereof may also increase. For example, an enterprise computer program, also referred to as a mainframe computer program, may contain hundreds of thousands of lines of associated metadata. A specific example will now be provided relative to mainframe computer programs marketed by CA, Inc. ("CA"), the assignee of the present application.

Specifically, CA mainframe computer programs generally require metadata that CA Mainframe Software Manager (CA MSM), now known as CA Chorus™ Software Manager (CA CSM), uses to configure the program after installation and deployment. The metadata is written in XML using an XML editor. The metadata must be error-free, complete, and must conform to a metadata schema that is specified by CA CSM Software Configuration Service (SCS).

Unfortunately, a mainframe computer program may include on the order of 150,000 lines of XML metadata. It is, therefore, difficult and time consuming to design metadata that is error-free and complete using an XML editor.

BRIEF SUMMARY

Various embodiments described herein can validate metadata against a metadata schema by semantically validating metadata objects in metadata for a computer program to confirm that required relationships among the metadata objects are present and conform to predefined rules. The metadata objects in the metadata for the computer program are also syntactically validated against a metadata schema for the metadata.

In some embodiments, the semantic validation is performed by semantically validating the metadata objects to confirm that data items that identify the metadata are present. In other embodiments, the semantic validation is performed by semantically validating the metadata objects to confirm that variables related to an environment of the metadata and a deployment of the metadata are present.

In some embodiments, the semantic validation is performed by semantically validating the metadata objects to confirm that required business objects that contain data that is used by the computer program are present and conform to predefined rules. For example, the semantic validation may be performed by semantically validating the metadata objects to confirm that at least one symbol table for the metadata is present and that each symbol table comprises at least one symbol entry. The semantic validation may also be performed by semantically validating the metadata objects to confirm that resources for the metadata are defined consistently. Specifically, these confirmations may be performed by confirming that each resource tracking data element has a unique tracking identification and confirming that resources do not include mutually exclusive attributes or instructions. The semantic validation may also be performed by semantically validating the metadata objects to confirm that external operations in the metadata do not comprise actions. The semantic validation may also be performed by semantically validating the metadata objects to confirm that processes comprise resource tracking identifications and process level descriptors.

In some embodiments, the syntactic validation may comprise marshalling the metadata objects into a string and unmarshalling the string to obtain errors. Moreover, the marshalling may comprise presenting the metadata schema and the metadata objects to a marshaller. The syntactic validation may further comprise collating errors that are returned by the unmarshalling.

It will be understood that various embodiments have been described above in connection with methods of operating a computer system. However, various other embodiments described herein can provide analogous computer systems and computer programs.

It is noted that aspects described herein with respect to one embodiment may be incorporated in different embodiments although not specifically described relative thereto. That is, all embodiments and/or features of any embodiments can be combined in any way and/or combination. Moreover, other systems, methods, and/or computer program products according to embodiments will be or become apparent to one with skill in the art upon review of the following drawings and detailed description. It is intended that all such additional systems, methods, and/or computer program products be included within this description, be within the scope of the present disclosure, and be protected by the accompanying claims.

BRIEF DESCRIPTION OF THE DRAWINGS

The accompanying drawings, which are included to provide a further understanding of the present disclosure and are incorporated in and constitute a part of this application, illustrate certain embodiment(s). In the drawings.

DETAILED DESCRIPTION

Various embodiments described herein can provide a MetaData Builder (MDB) that allows metadata to be built by the way of two-way user interaction, that can generate metadata that is complete and error-free. As was noted above, a mainframe computer program may include on the order of 150,000 lines of XML metadata. It may be difficult to provide complete and error-free XML data of this magnitude using an XML editor.

Various embodiments will be described herein in connection with specific CA mainframe computer programs. However, various embodiments described herein may be used with mainframe computer programs that are distributed by other organizations and/or for other computer programs, such as enterprise, application, personal, pervasive and/or embedded computer programs.

Figure 1:
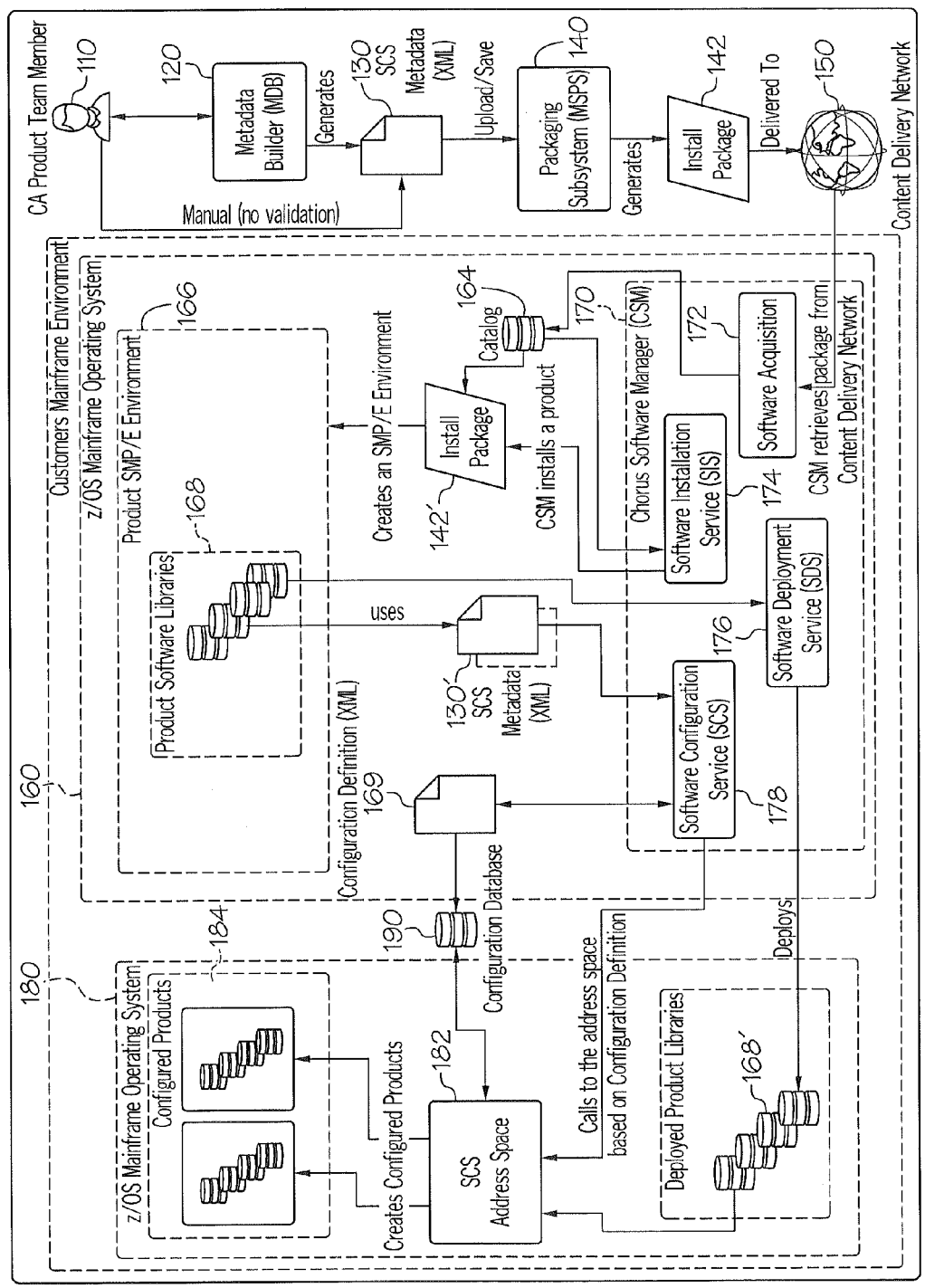
FIG. 1 is a block diagram of a computer program development and use environment according to various embodiments described herein.

FIG. 1 is a block diagram of a computer program (also referred to herein as "a computer program product" or simply as a "product") development and use environment according to various embodiments described herein.

Referring to FIG. 1, a metadata developer, such as a CA Product Team Member 110 at a user terminal, interacts with a MetaData Builder (MDB) 120 according to various embodiments described herein, to produce XML Software Configuration Services (SCS) metadata 130. The SCS metadata 130 is then packaged with a CA product by a packaging subsystem 140, and the resulting install package 142 is distributed to the customer using a content delivery network, such as the CA Content Delivery Network 150.

In the customer's mainframe environment 160, Chorus Software Manager (CSM) 170 uses its Software Acquisition component 172 to retrieve the install package 142 from the Content Delivery Network 150. The install package 142' is then stored as information in a Catalog database 164. The CSM 170 Software Installation Service (SIS) 174 uses a product's associated Install Package 142' located in the Catalog database 164 to create an SMP/E Environment 166. Each SMP/E Environment 166 contains a set of software libraries 168 associated with the installed product. The CSM 170 Software Deployment Service (SDS) 176 transmits a copy of the Product Software Libraries 168' to the mainframe system where the deployed product is to be configured 180.

The SCS metadata 130' which was created by the MDB 120 and is included within one or more of the installed Product Software Libraries 168 is used by the Chorus Software Manager (CSM) 170 Software Configuration Services (SCS) 178 to create a Configuration Definition 169. A Configuration database 190 is updated with the resulting Configuration Definition 169.

The CSM 170 SCS 178 interacts with the SCS Address Space 182 running on a z/OS Mainframe 180 where the deployed Product Libraries 168' are accessed to create a configured instance of the product 184. SCS 178 interacts with the SCS Address Space 182 to orchestrate the implementation of a set of configuration operations defined in the constructed Configuration Definition 169. Each SCS Configured Product 184 is constructed using its associated SCS Metadata 130 that was created and generated by the MDB 120.

It will be understood that any of the blocks of FIG. 1 including the MDB 120, packaging subsystem 140, content delivery network 150 and the customer's mainframe environment 160, and/or any combination or subcombination of the blocks of FIG. 1, may be embodied as one or more enterprise, application, personal, pervasive and/or embedded computer systems that are operable to receive, transmit, process and store data using any suitable combination of software, firmware and/or hardware and that may be standalone or interconnected by any conventional, public and/or private, real and/or virtual, wired and/or wireless network including all or a portion of the global communication network known as the Internet, and may include various types of tangible, non-transitory computer readable media.

Figure 2:
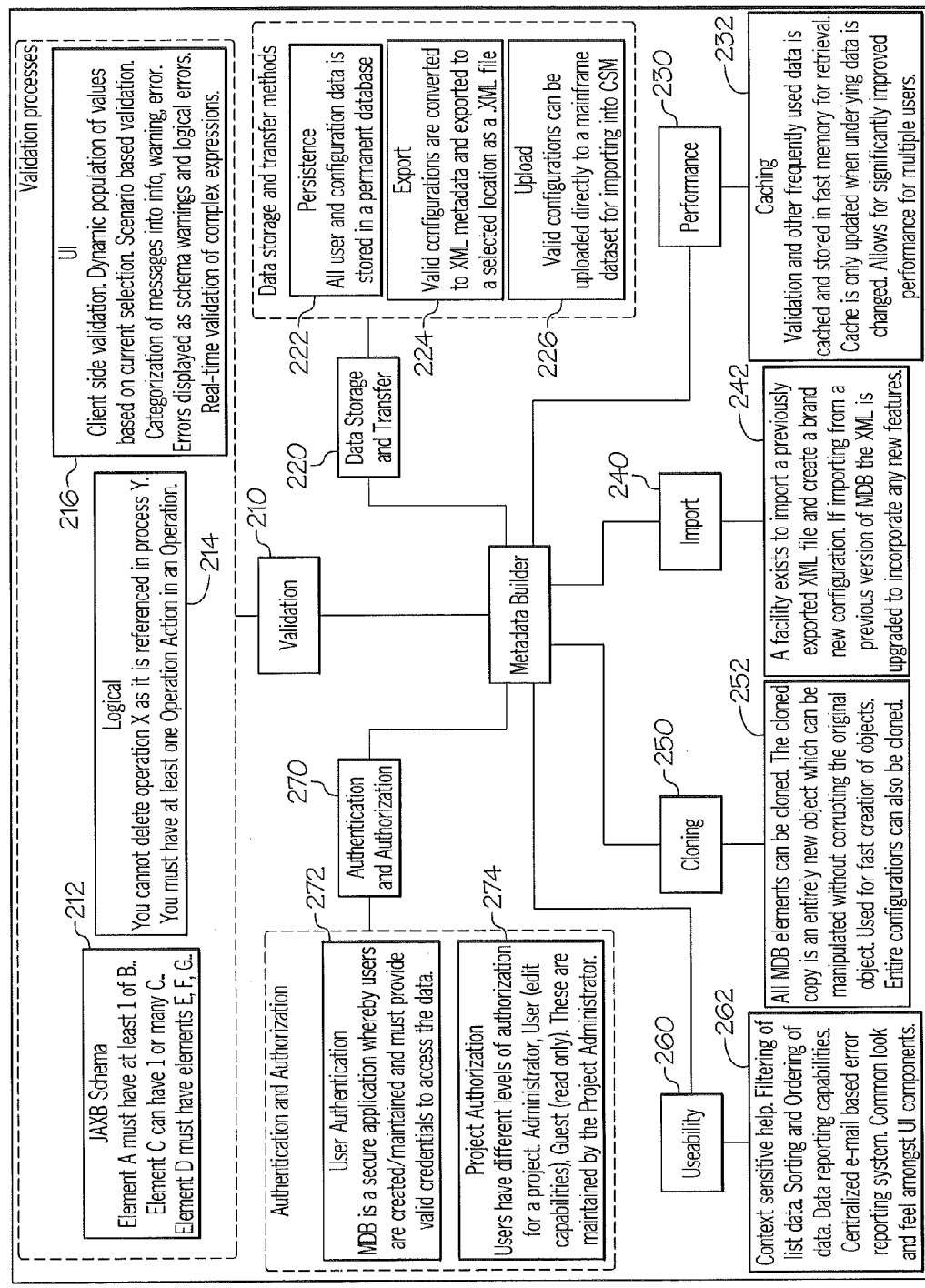
FIG. 2 is a block diagram of a metadata builder according to various embodiments described herein.

FIG. 2 is a block diagram of a metadata builder according to various embodiments described herein, which may correspond to the MDB 120 of FIG. 1. The MDB 120 includes a validation system 210, a data storage and transfer system 220, a performance system 230, an importing system 240, a cloning system 250, a usability system 260 and an authentication and authorization system 270.

The authentication and authorization system 270 provides user authentication (Block 272) and also allows different levels of authorization for the project (Block 274), so that, for example, one user may have write access, while other users may have read access. The validation system 210 provides schema validation 212, logical validation 214 and a User Interface (UI) 216 that provides interactive metadata creation. The data storage and transfer system 220 allows persistent storage of configuration data as it is created (Block 222), allows exporting of valid configurations (Block 224) and uploading of the valid configuration to CSM (Block 226). The performance system 230 provides caching (Block 232) of validated and frequently used data to allow improved performance with multiple users. The importing system 240 provides a facility to import a previously exported XML metadata set and create a new configuration (Block 242). The cloning system 250 allows new data objects to be cloned from existing data objects (Block 252). Finally, the usability function 260 provides context-sensitive help and other usability functions (Block 262).

The information pertaining to a CA product which can be deployed on a mainframe by CA Chorus™ Software Manager (CSM) is contained in metadata in XML format. This metadata is constructed by means of a user interface application called CA Chorus™ Software Manager SCS MetaData Builder (MDB). The metadata can also be constructed externally to MDB. In the MDB application, the metadata is stored in data objects known as "configurations". The creation of a configuration is an iterative process through which the user is guided by various validation and messaging techniques. When a configuration is complete (contains no errors) it can be exported to an external file for storage on a file system or uploaded directly to a mainframe for storage within a data set.

Various embodiments of logical validation 214 are described in application Ser. No. 14/223,376, entitled "Logical Validation for Metadata Builder", filed concurrently herewith, the disclosure of which is hereby incorporated herein by reference in its entirety as if set forth fully herein. Various embodiments of importing 240 are described in application Ser. No. 14/223,260, entitled "Importing Metadata Into Metadata Builder", filed concurrently herewith, the disclosure of which is hereby incorporated herein by reference in its entirety as if set forth fully herein. Various embodiments of schema validation 212 are described in the present application. Finally, various embodiments of a user interface 216 are described in application Ser. No. 14/223,307, entitled "Interactive User Interface for Metadata Builder", filed concurrently herewith, the disclosure of which is hereby incorporated herein by reference in its entirety as if set forth fully herein.

Schema Validation—High Level Description

The present embodiments provide a schema validation function, such as the schema validation function 212 of FIG. 2, for a metadata builder, such as MDB 120 of FIG. 2.

Schema validation 212 is used to validate metadata objects against a schema, to ensure that the metadata conforms to the schema. In some embodiments, the schema is based on SCS. The schema is contained in XML Schema Definition files (.xsd extension) and referenced in the application via Java objects using a Java library, named JAXB. The schema validation 212 produces warnings about missing objects that need to be created, based on the schema. For example, the schema validation 212 may create a warning that Element A must have at least one of Element B. Then, when Element B is created, this warning may disappear, but warnings based on the newly created Element B may be created. Thus, as a Java object is specified, some schema errors may disappear, but other errors may be added. As the metadata becomes fully built, the list of errors can decrease and eventually disappear.

More specifically, schema validation may operate by comparing the metadata against an XSD schema. The schema is a collection of XSD files that provide a set of rules to which the metadata must conform. The schema includes various data types and structures. If the metadata does not adhere to this structure, then error information is relayed to the user. The data is stored in Java classes, which are then marshaled to convert them to XML. This XML is validated using JAXB libraries and a Java framework named Spring.

Figure 3:
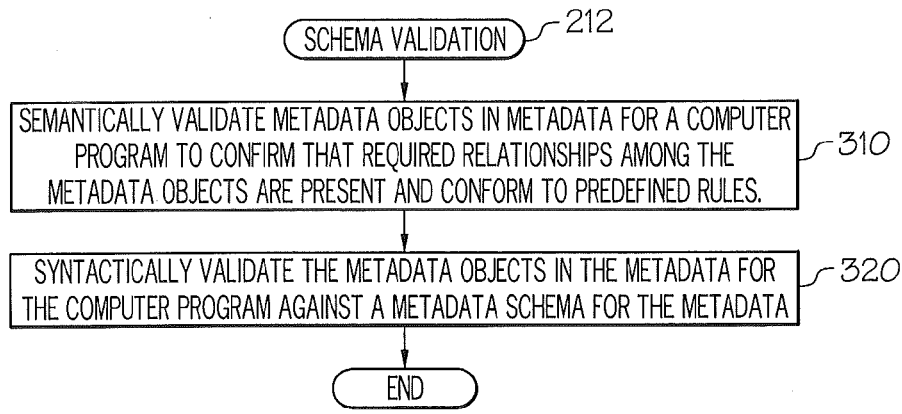
FIGS. 3-8, 9A and 9B, 10-14 and 15A-15B are flowcharts of operations that may be performed for schema validation according to various embodiments described herein.

FIG. 3 is a flowchart of operations that may be performed for schema validation according to various embodiments described herein. These operations may be performed by a metadata schema validation function, such as the schema validation function 212 of FIG. 2.

In general, for a configuration metadata object to be considered valid, it must be both semantically and syntactically correct. Schema validation can perform operations to ensure that the candidate configuration is semantically and syntactically correct. Semantic validation may be performed, for example, by running the candidate configuration object through a series of business object rules, to ensure the content of the metadata is valid. Accordingly, referring to Block 310 of FIG. 3, metadata objects in metadata for a computer program are semantically validated to confirm that required relationships among the metadata objects are present and conform to predefined rules.

Syntactic validation provides a comparison of the marshalled configuration metadata against an abstract representation of the metadata, known as a "schema definition". As used herein, "marshalling" means an operation, such as provided by a Java programming language, to convert a Java object into an XML object. Moreover, as used herein, the term "unmarshalling" means an operation such as may be provided by a Java™ programming language, to covert an XML string into a Java object structure. Accordingly, referring to Block 320, the metadata objects in the metadata for the computer program are syntactically validated against a metadata schema for the metadata.

Figure 4:
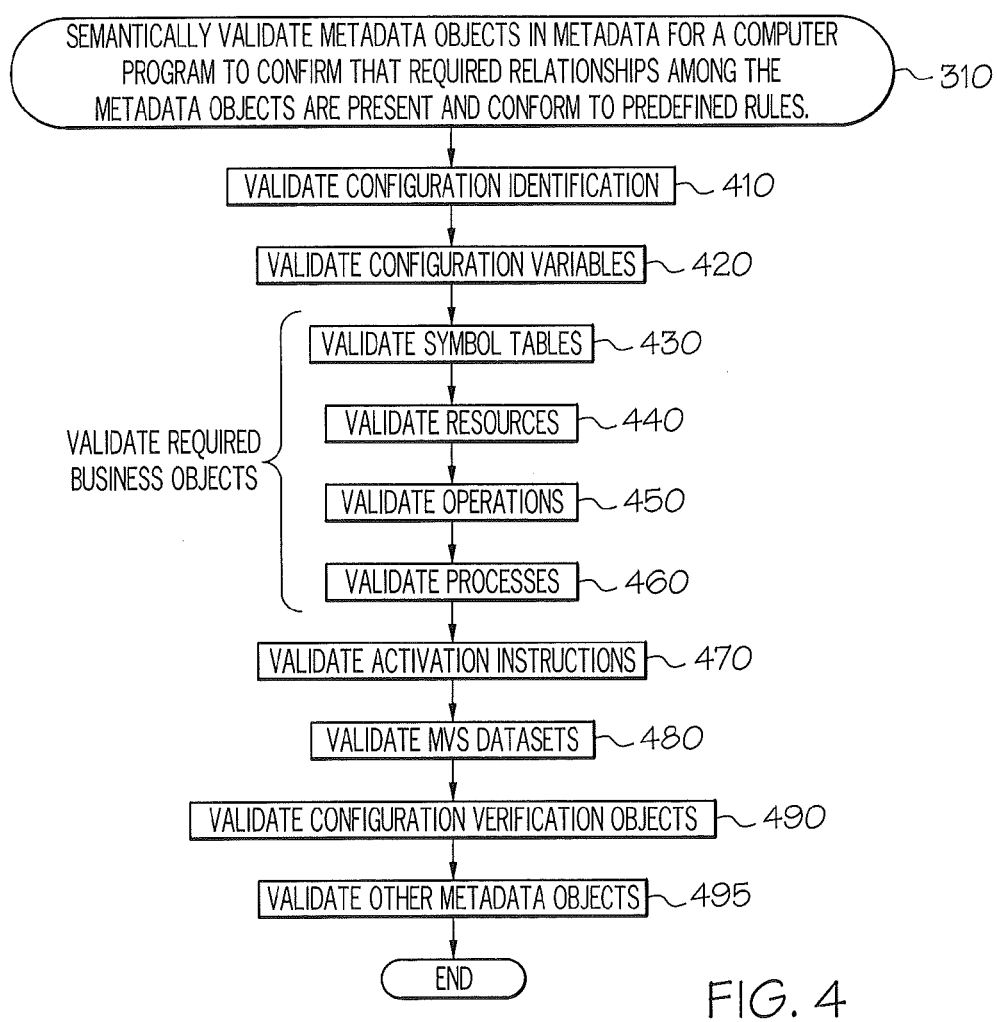

FIG. 4 is a flowchart of operations that may be performed to semantically validate metadata objects in metadata for a computer program to ensure that required relationships among the metadata objects are present and correct, which may correspond to the operations of Block 310 of FIG. 3. Referring to FIG. 4, at Block 410, configuration identification is validated. Configuration identification can confirm that data items that identify the metadata are present. Detailed operations to validate configuration identification will be described in connection with FIG. 6 below.

At Block 420, configuration variables are validated. In general, these operations confirm that variables related to an environment of the metadata and a deployment of the metadata are present. Detailed operations to validate configuration variables will be described below in connection with FIG. 7.

At Block 430, symbol tables are validated. In general, these operations confirm that at least one symbol table for the metadata is present and that each symbol table includes at least one symbol entry. Detailed operations to validate symbol tables will be described below in connection with FIG. 8.

Figure 9A:
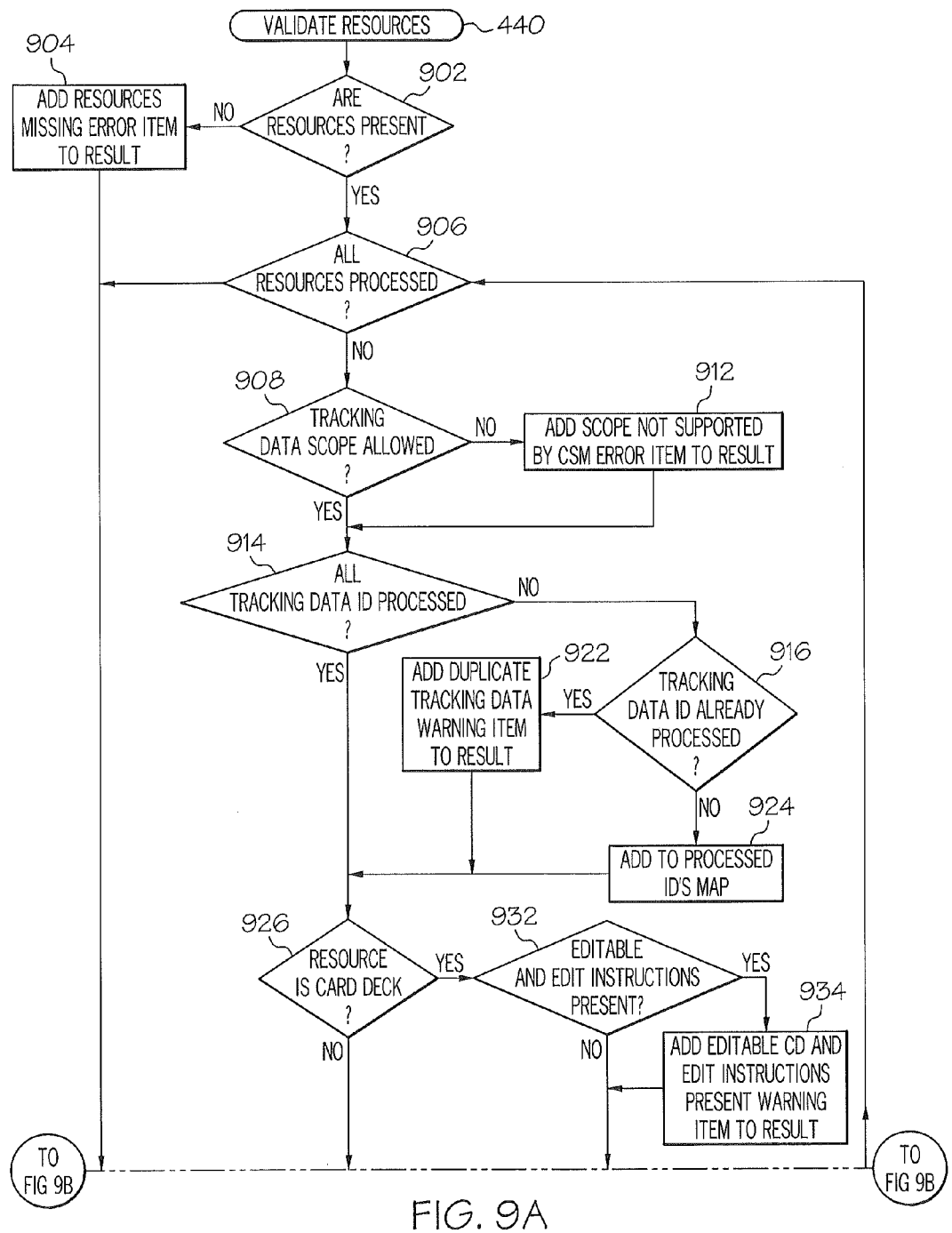
Figure 9B:
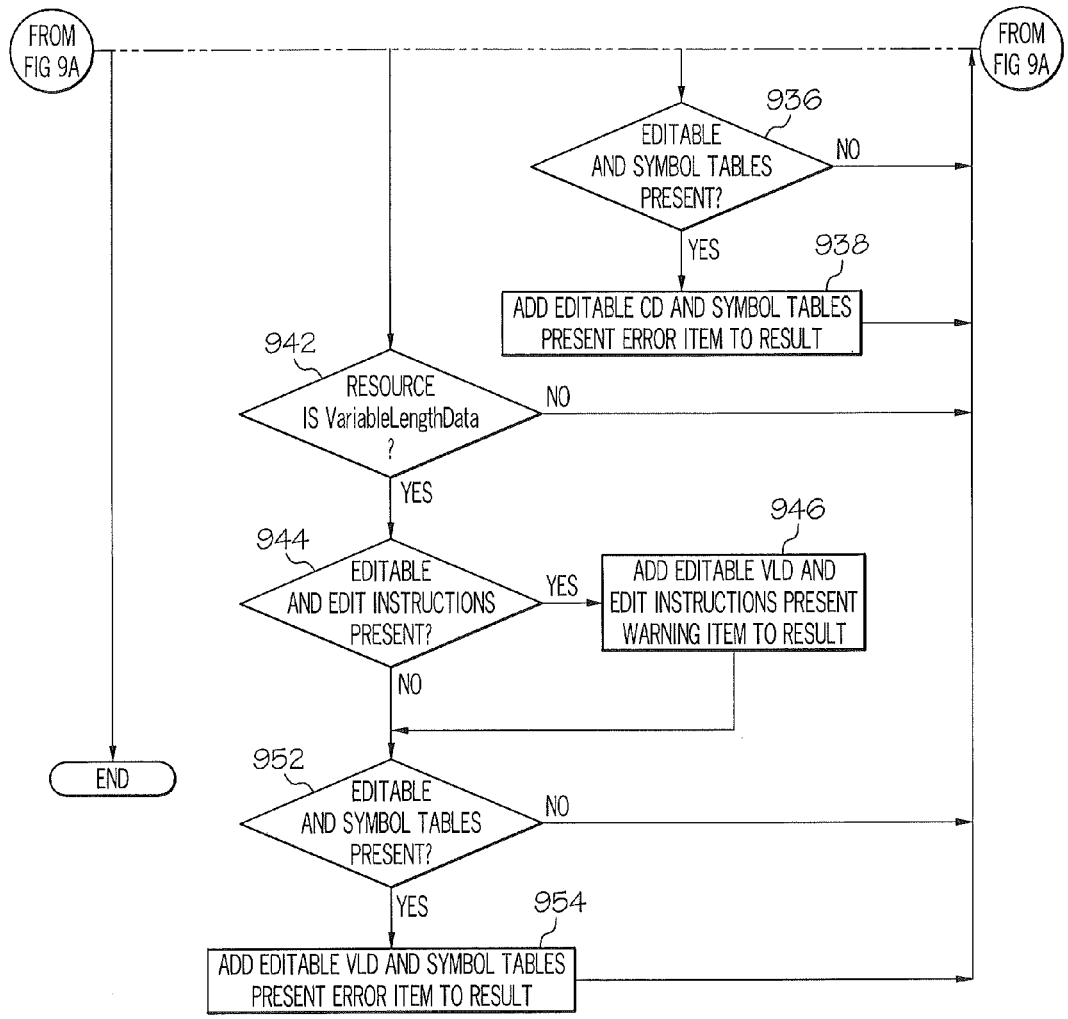

At Block 440, resources are validated. In general, these operations confirm that resources for the metadata are defined consistently. Detailed operations to validate configuration resources will be described below in connection with FIGS. 9A and 9B, which will be referred to herein collectively as FIG. 9.

At Block 450, operations are validated. In general, these operations confirm that external operations on the metadata do not include actions. Detailed operations to validate operations will be described below in connection with FIG. 10.

At Block 460, processes are validated. In general, these operations confirm that processes include resource tracking identifications and process level descriptors. Detailed operations to validate processes will be described below in connection with FIG. 11.

At Block 470, activation instructions are validated. In general, these operations confirm that any activation instructions are properly referenced. Detailed operations to validate activation instructions will be described below in connection with FIG. 12.

The operations of Blocks 430, 440, 450 and 460 may also be generalized to provide semantic validation of metadata objects to confirm that required business objects that contain data that is used by the computer program are present and correct. More specifically, business objects are objects that hold data that will be included in the result that is deployed to the mainframe when the computer program is deployed. These results may relate to the enterprise that is deploying the computer program, rather than relating to the metadata itself. Symbol tables (Block 430), resources (Block 440), operations (Block 450) and processes (Block 460) provide specific examples of semantically validating the metadata objects to confirm that required business objects that contain data that is used by the computer program are present and correct. Other required business objects may also be semantically validated according to other embodiments.

Continuing with the description of FIG. 4, at Block 480, MVS datasets are validated. In general, these operations confirm that any MVS datasets are properly referenced. Detailed operations to validate MVS datasets will be described below in connection with FIG. 13.

At Block 490, configuration verification objects are validated. In general, these operations confirm that any verification objects include an associated operation. Detailed operations to validate verification objects will be described below in connection with FIG. 14.

At Block 495, other metadata objects are validated. In general, required or optional metadata objects other than those described above may be semantically validated.

It will be understood that not all of the operations of Blocks 410-495 need be performed. Specifically, some of these validations may be required, whereas other validations may be optional. In a specific example, the validations of Blocks 470-495 may be optional, whereas the operations of Blocks 410-460 may be required. Moreover, the operations of Blocks 410-495 may be performed in a different order than illustrated in FIG. 4. For example, in some embodiments, required and optional operations may be interleaved.

Figure 5:
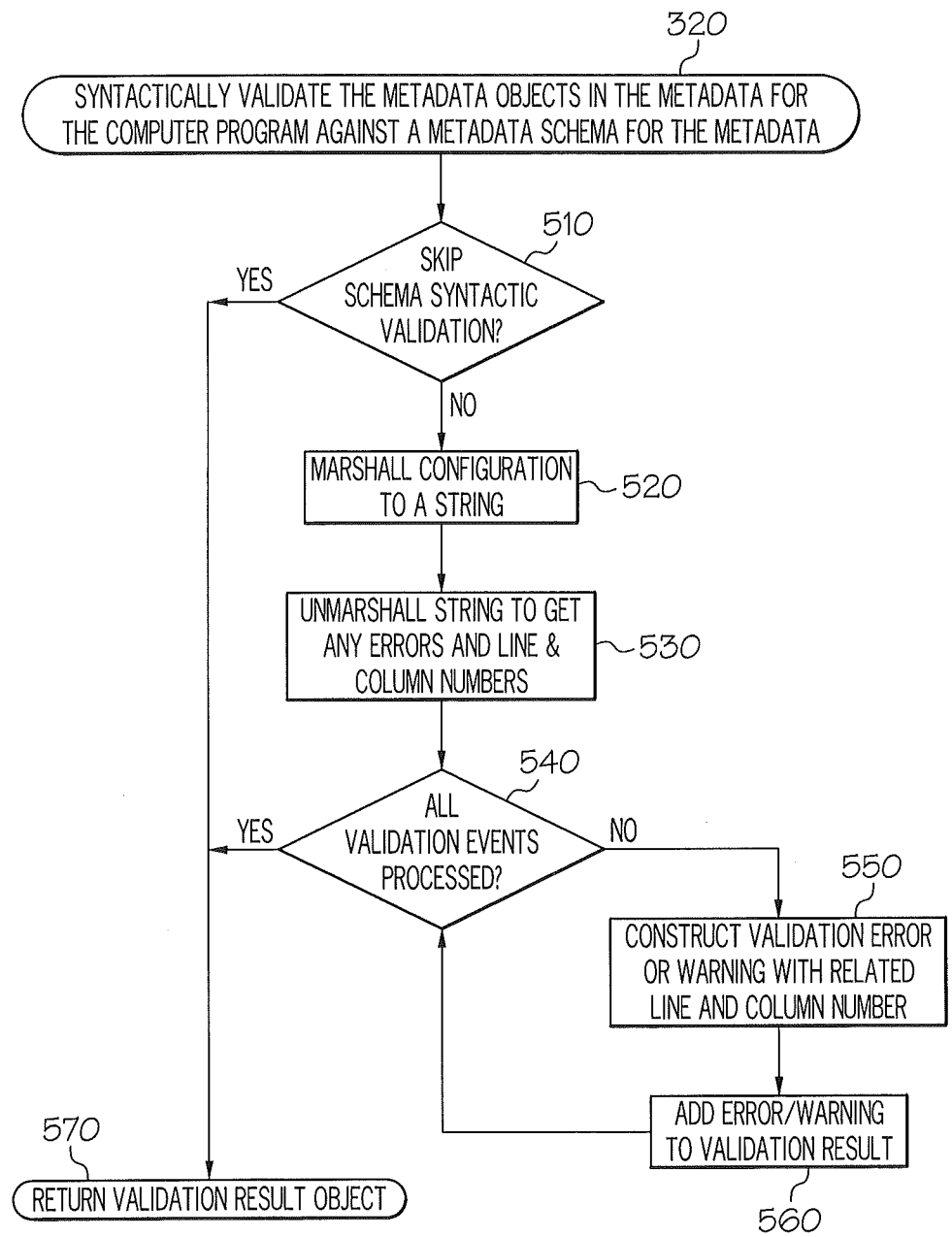

FIG. 5 is a flowchart of operations that may be performed to syntactically validate the metadata objects in the metadata for the computer program against a metadata schema for the metadata, which may correspond to Block 320 of FIG. 3.

Referring to FIG. 5, at Block 510, a determination is made as to whether the schema syntactic validation should be skipped. Specifically, there are conditions where the user does not require the configuration to be validated against the JAXB marshaller. For example, if the object is being edited in the user interface, then during the construction phase, many items may be missing from the outset. The logical validator and caching algorithms may handle this validation, since JAXB marshalling is a time-intensive operation. Thus, if the option to skip syntactic validation is selected at Block 510, then no further validation takes place and the validation object is returned to the caller at Block 570.

Figure 15A:
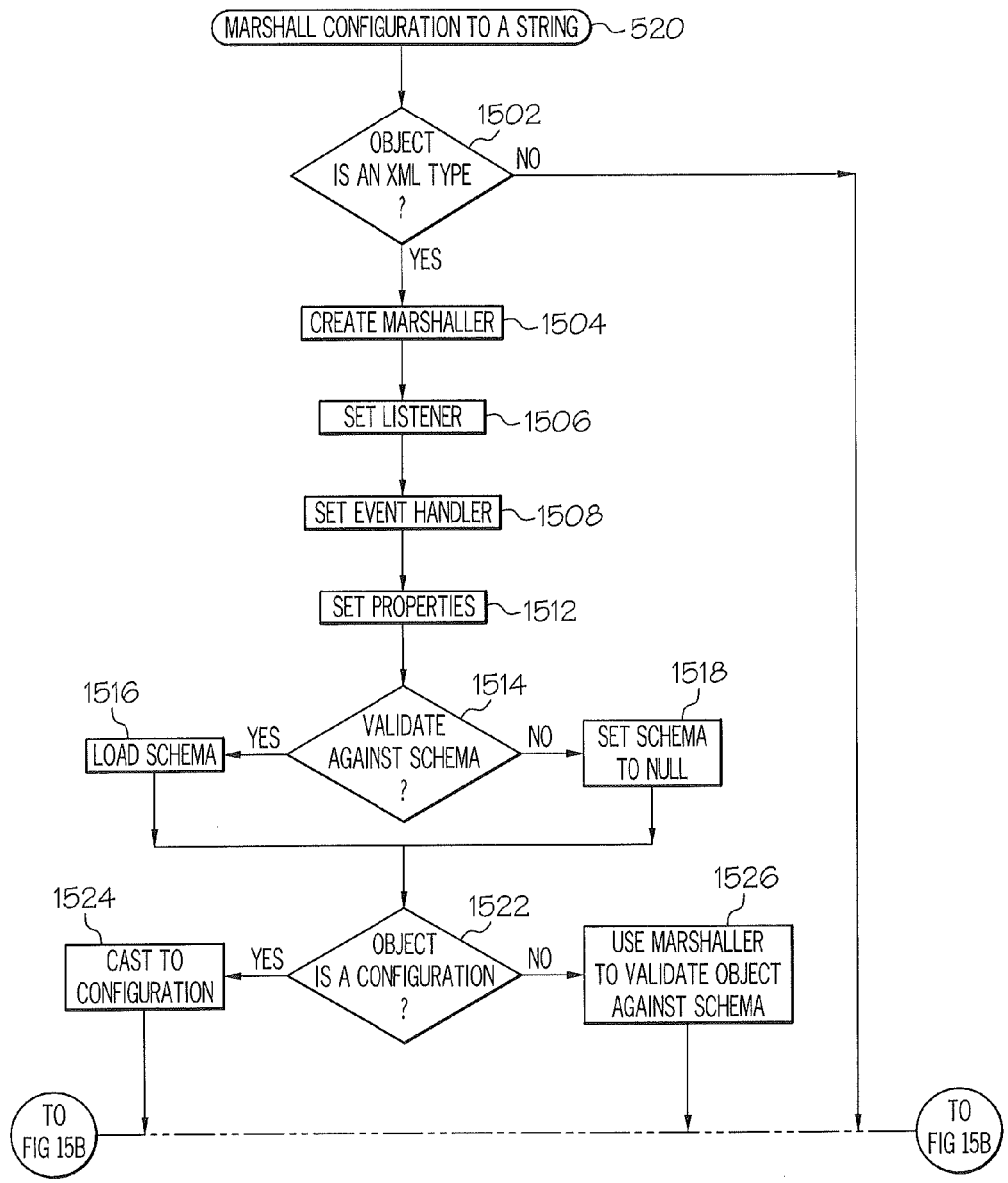
Figure 15B:
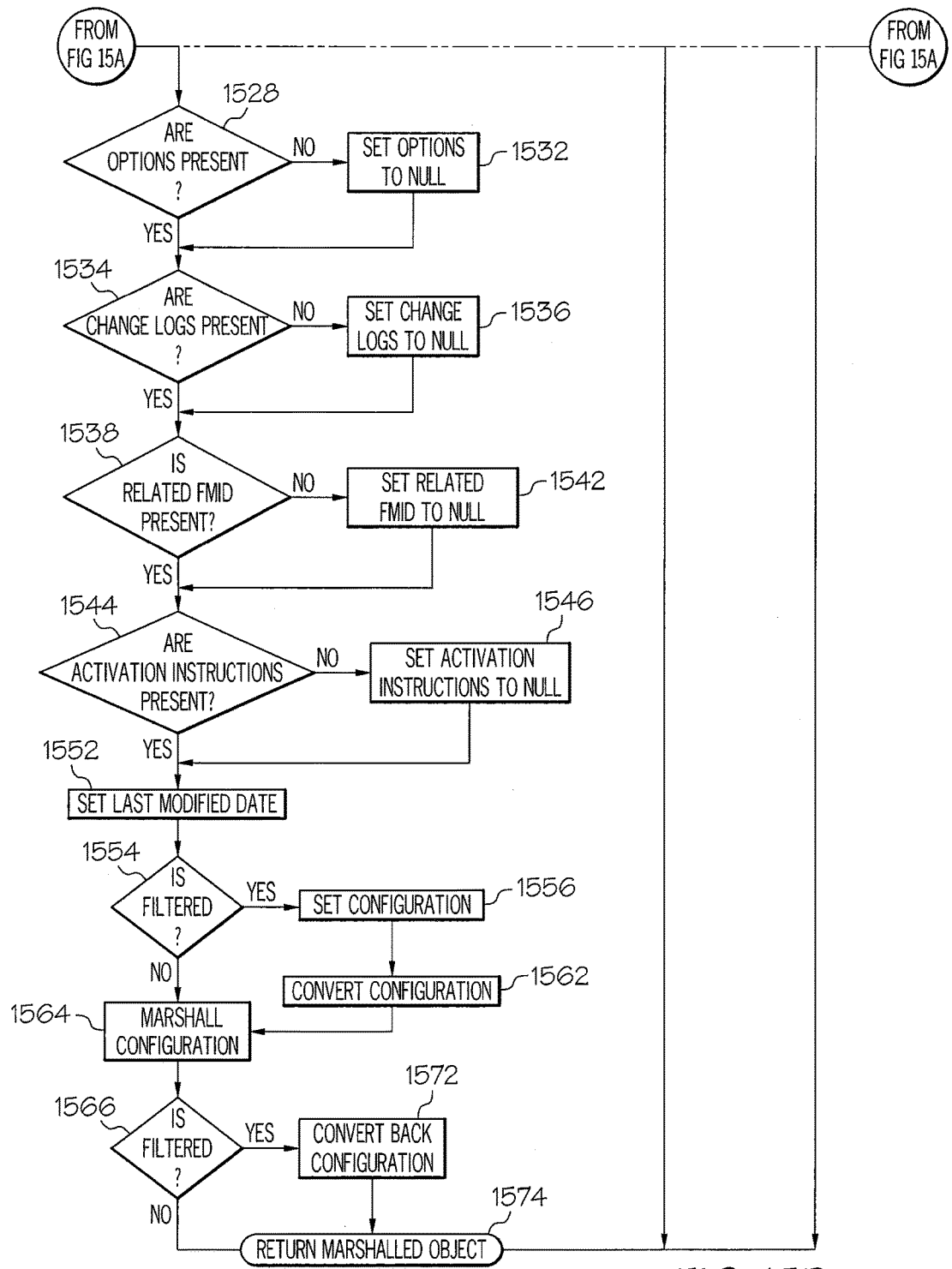

On the other hand, if syntactic validation is not skipped at Block 510, then at Block 520, the configuration is marshalled to a string. Detailed operations for marshalling a configuration to a string, corresponding to Block 520, will be described below in connection with FIGS. 15A and 15B, which will be referred to herein collectively as FIG. 15.

After marshalling is complete, the string is unmarshalled at Block 530, in order to obtain specific line and column numbers for any errors. At Block 540, a determination is made as to whether all validation events have been processed and, if so, the validation result object is returned at Block 570.

If all validation events have not been processed at Block 540, then at Block 550, errors generated from the unmarshalling process are collated. For each error, a validation error is constructed, which contains the detailed information about the error and the corresponding line and column number. This information can be used to locate the offending section of XML when viewed in the XML viewing pane. Thus, at Block 560, the errors and warnings are added to the validation result.

Schema Validation—Intermediate Level Description

Figure 6:
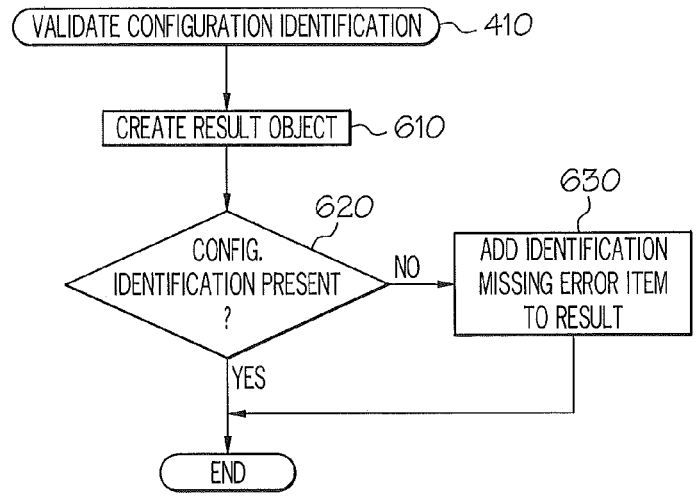

FIG. 6 is a flowchart of operations that may be performed to validate a configuration identification, which may correspond to Block 410 of FIG. 4. Referring to FIG. 6, at Block 610, a result object is created. The result object is a container object which holds the result of a validation attempt and informs the caller of the results. If the attempt is a failure, the result object contains detailed information about each failure in both descriptive format and exactly where (line/column numbers) in the XML the error occurred. The information returned from the syntactic validation using a JAXB marshaller can often be user-unfriendly. Operations of Block 610 can transform the cryptic messages into a more reader-usable format. At Block 610, the result object is created and initialized.

It will be understood that creation of the result object is illustrated in Block 610 as part of the "Validate Configuration Identification" operations of Block 410. However, in general, the result object creation of Block 610 should be performed before any semantic validation of FIG. 4 is performed. Stated differently, the result object should be created at Block 610 before any of the operations of Blocks 410-495 are performed, since they may be performed in a different order than was illustrated in FIG. 4.

Referring again to FIG. 6, at Block 620, a test is made as to whether a configuration identification is present. A configuration identification is a set of data items which may be critical to a well-formed configuration. If any of the contents are missing, an error is created and added to the result object at Block 630.

Figure 7:
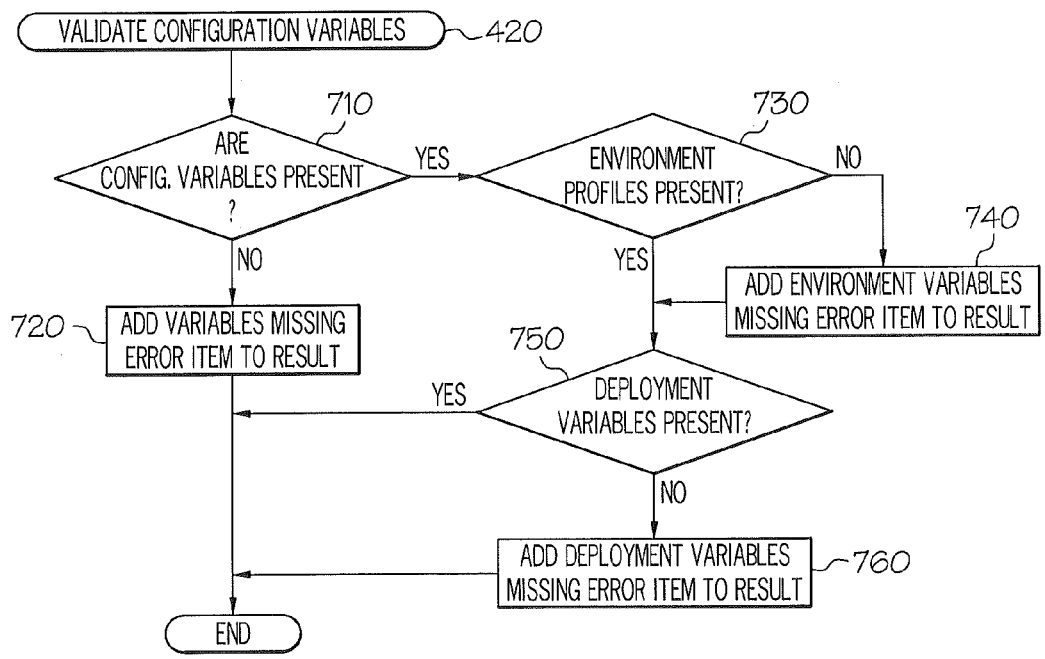

FIG. 7 is a flowchart of operations that may be performed to validate configuration variables, which may correspond to Block 420 of FIG. 4. Configuration variables may also be required items. They may include environment variables and deployment variables. If these data items are not present, then an error is created for the whole item type of any individual missing items.

Specifically, at Block 710, a determination is made as to whether configuration variables are present. If not, then at Block 720, a variable's missing error item is added to the result. If yes, then a test is made at Block 730 as to whether environment profiles are present. If not, then at Block 740, an environment variables missing error item is added to the result. If yes, at Block 750, a test is made as to whether deployment variables are present. If no, a deployment variables missing error item is added to the result. If they are present, operations end.

Figure 8:
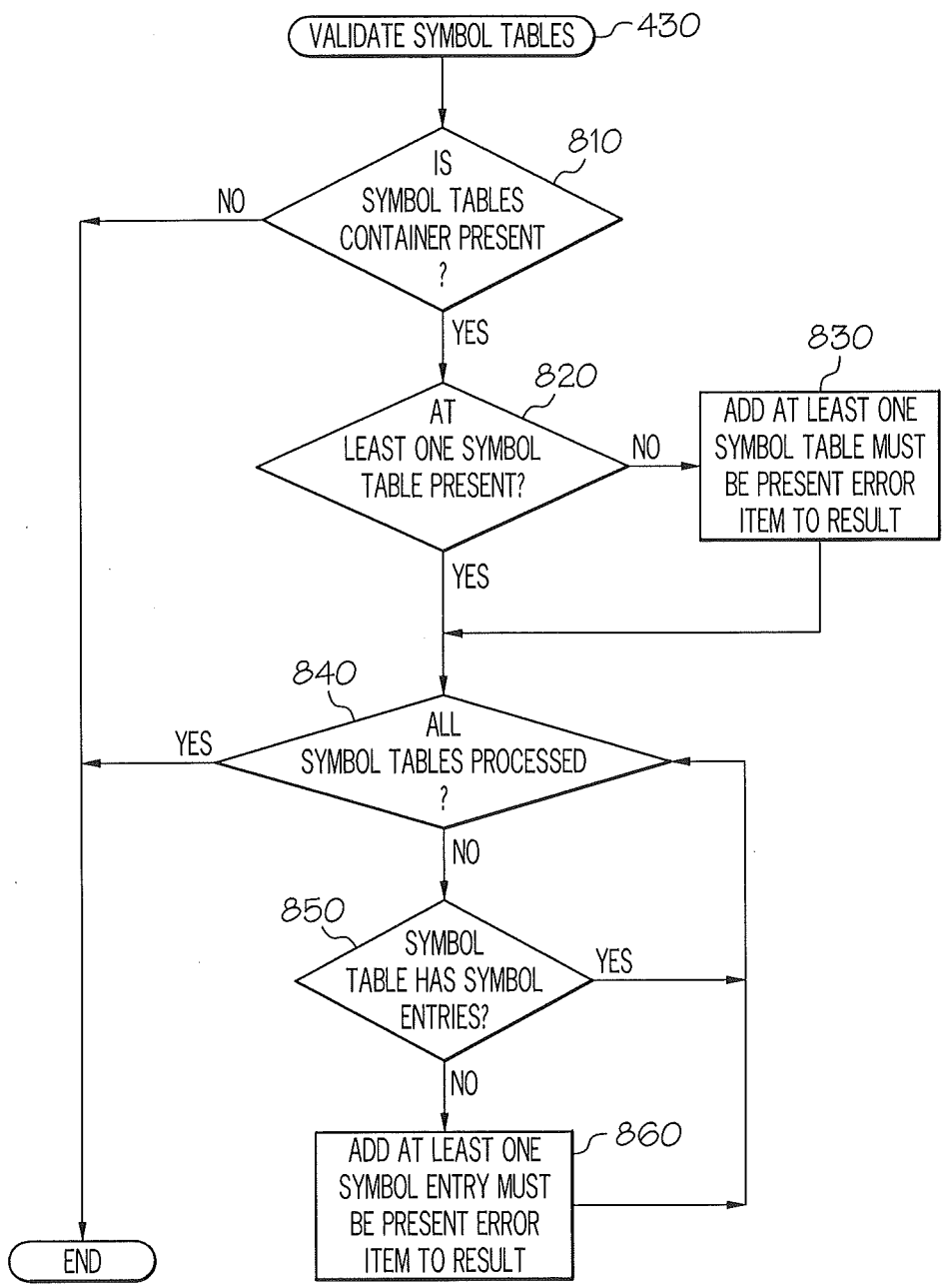

FIG. 8 is a flowchart of operations that may be performed to validate symbol tables, which may correspond to Block 430 of FIG. 4. Symbol tables are also required items. Each symbol table may comprise one or more symbol entries. If the configuration does not contain any symbol tables, then an error is created. Moreover, if an existing symbol table is missing symbol entries, then a further error for that symbol table is created.

Specifically, referring to FIG. 8 at Block 810, a determination is made if symbol tables are present. If not, then operations end. If yes, a test is made at Block 820 as to whether at least one symbol table is present. If not, then at Block 830, an error message item is added to the result. If yes, then a test is made at Block 840 as to whether all symbol tables have been processed. If so, operations end, but if not, a test is made at Block 850 as to whether the symbol table has symbol entries. If yes, then other remaining symbol tables are again processed at Block 840. If not, then an error item is added to the result at Block 860.

FIG. 9 is a flowchart of operations that are performed to validate resources, which may correspond to Block 440 of FIG. 4. Referring to FIG. 9, at Block 902, a determination is made as to whether resources are present. Resources are required items. If no resources are present, then an error is created and added to the return object at Block 904. If resources are present, then each one is checked individually at Block 906. At Block 908, a determination is made regarding tracking data. Resources contain a data item called tracking data. It is an optional data item. Tracking data scope is an attribute of the tracking data. Each version of the schema allows a restricted set of scope values. If the current resource type scope is not allowed for the schema version, an error is created at Block 912.

Operations then proceed at Block 914, to process tracking data IDs. Tracking data IDs are an attribute of a resource tracking data. Each tracking data ID must be unique in the configuration, as it is used for referencing in other data items. If the current tracking data ID has already been encountered at Block 916, then a warning message is created at Block 922. If this tracking data ID has not been encountered at Block 916, then it is stored for later comparison at Block 924.

Operations then proceed to test for resource card decks at Block 926. Resource card decks are a specific resource type. If the current resource is a card deck, then it cannot have both an editable attribute and edit instructions present, as they are mutually exclusive. This test is made at Block 932, and if this condition is present, a warning is created at Block 934. At Block 936, "editable" and "having symbol tables present" in the resource are also mutually exclusive, so that if present, another error is created at Block 938.

At Block 942, a test is made as to whether the resource is VariableLengthData (VLD). VariableLengthData items are a specific resource type. If the current resource is a VLD, then it cannot have both an editable attribute and edit instructions present, as they are mutually exclusive. This test is made at Block 944. If this condition is present, then a warning is created at Block 946.

Finally, at Block 952, "editable" and "having symbol tables present" in the resource is also mutually exclusive, so if this is the case, another error is created at Block 954.

Figure 10:
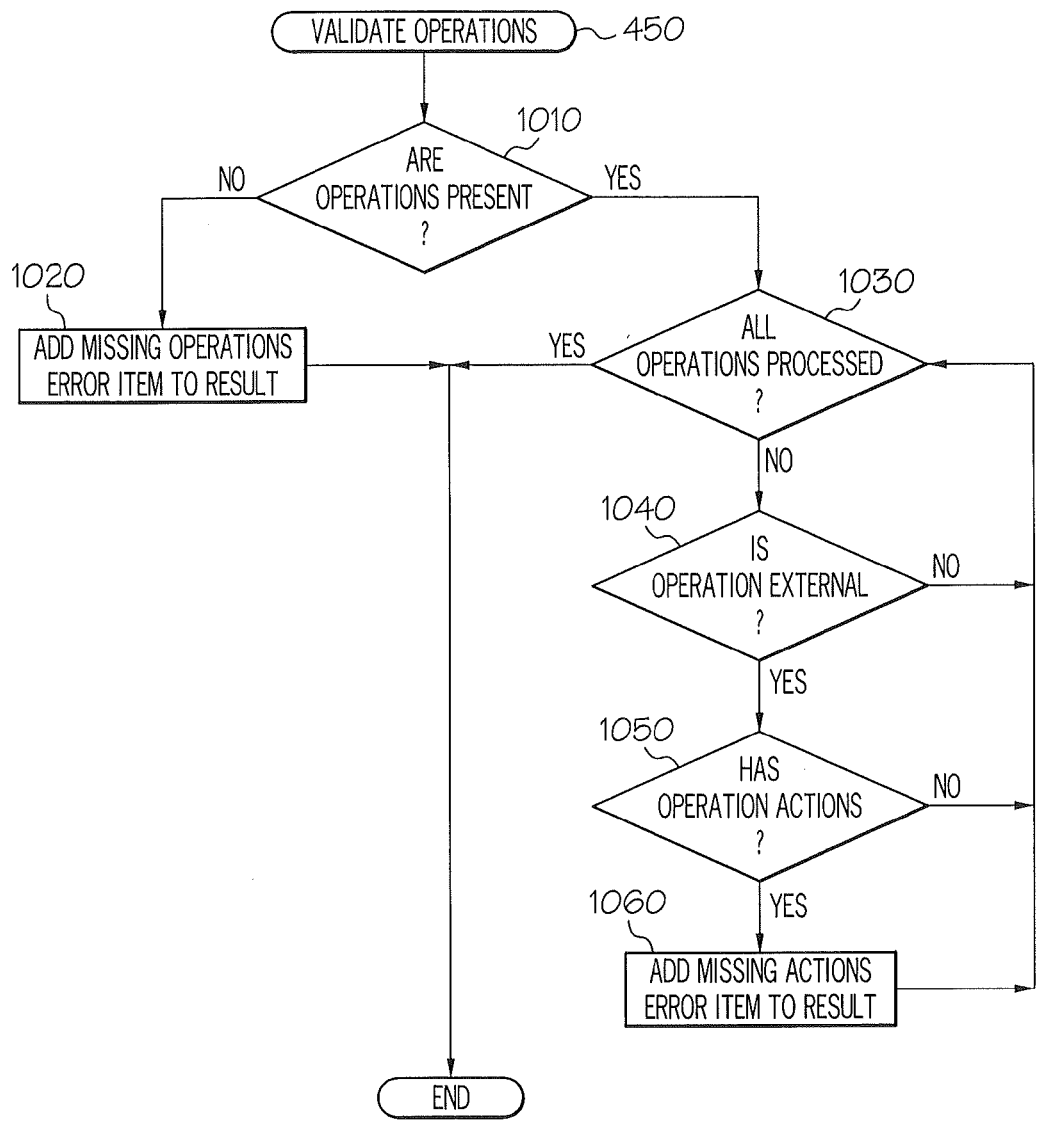

FIG. 10 is a flowchart of operations that may be performed to validate operations, which may correspond to Block 450 of FIG. 4. Operations are a required item. Specifically, at Block 1010, a test is made as to whether operations are present and, if not, an error is created at Block 1020. If they are present, then operations are processed individually at Block 1030. A test is made at Block 1040 if the operation is an external type operation. If this is the case, then it cannot contain operation actions, so a test is made at Block 1050. If operation actions are present, an error is created at Block 1060.

Figure 11:
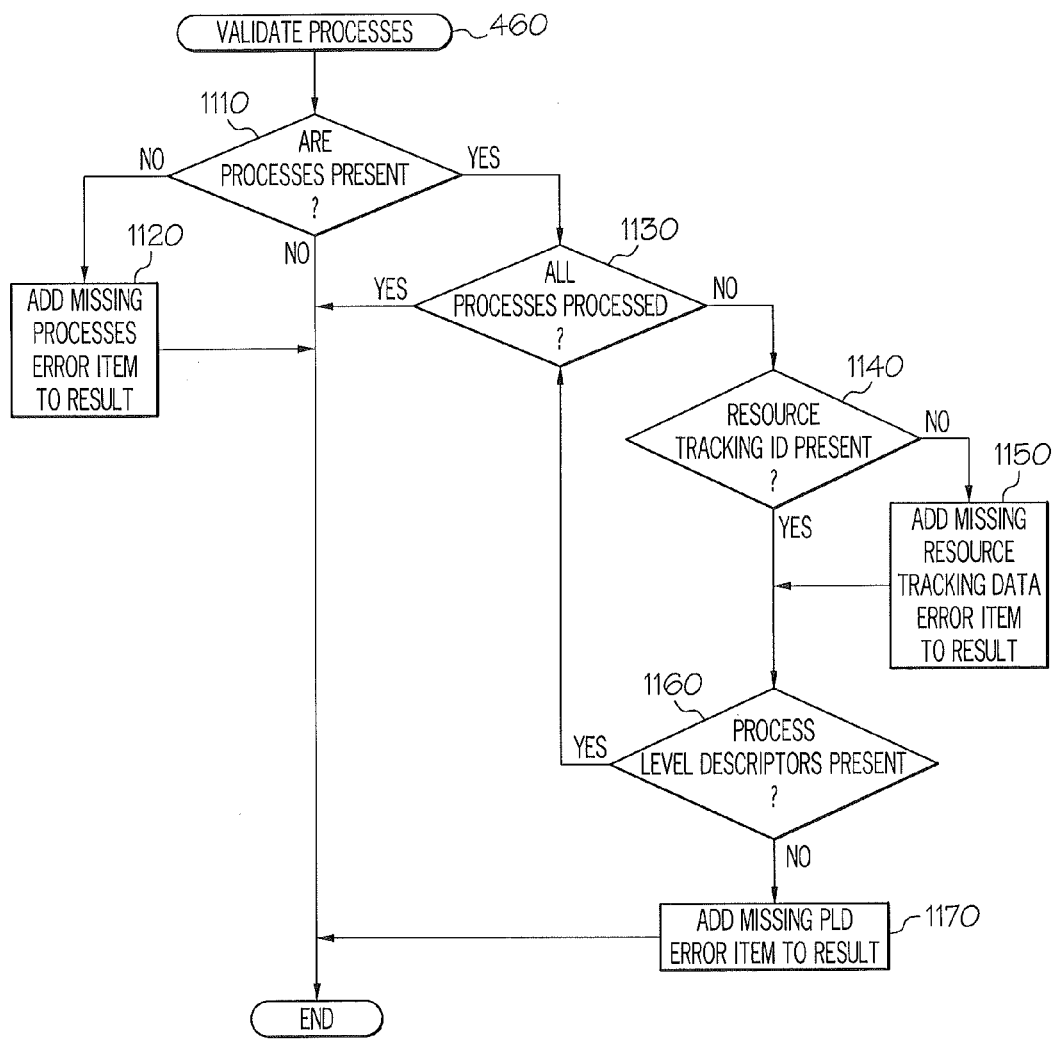

FIG. 11 is a flowchart of operations that may be performed to validate processes, which may correspond to Block 460 of FIG. 4. Referring to FIG. 11, processes are a required item, so if they are not present at Block 1110, then an error message is created at Block 1120. If processes are present at Block 1110, they are processed individually at Block 1130. For a given process, a test is made at Block 1140 as to whether a resource tracking ID is present. Processes must have a referenced resource tracking ID and, if not, an error message is created at Block 1150. Moreover, processes must also contain process level descriptors, so a test is made at Block 1160. If they are not present, an error is noted at Block 1170.

Figure 12:
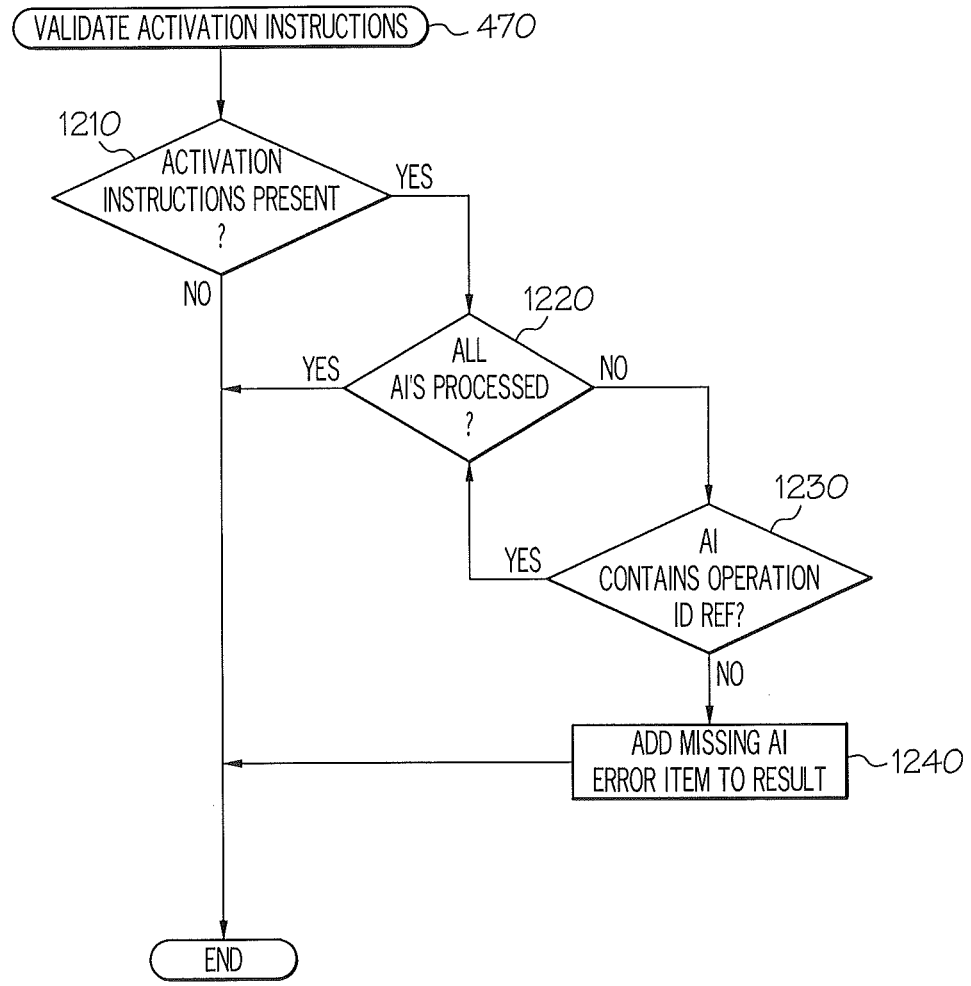

FIG. 12 is a flowchart of operations that may be performed to validate activation instructions, which may correspond to Block 470 of FIG. 4. Activation instructions are optional, so a test is made as to whether they are present at Block 1210. If they are not present, then operations end, as activation instructions are optional. If they are present, they are processed individually at Block 1220. Specifically, a test is made at Block 1230 as to whether the activation instruction contains an operation ID reference. Each activation instruction must contain at least one referenced operation. If this is not the case, an error is created at Block 1240.

Figure 13:
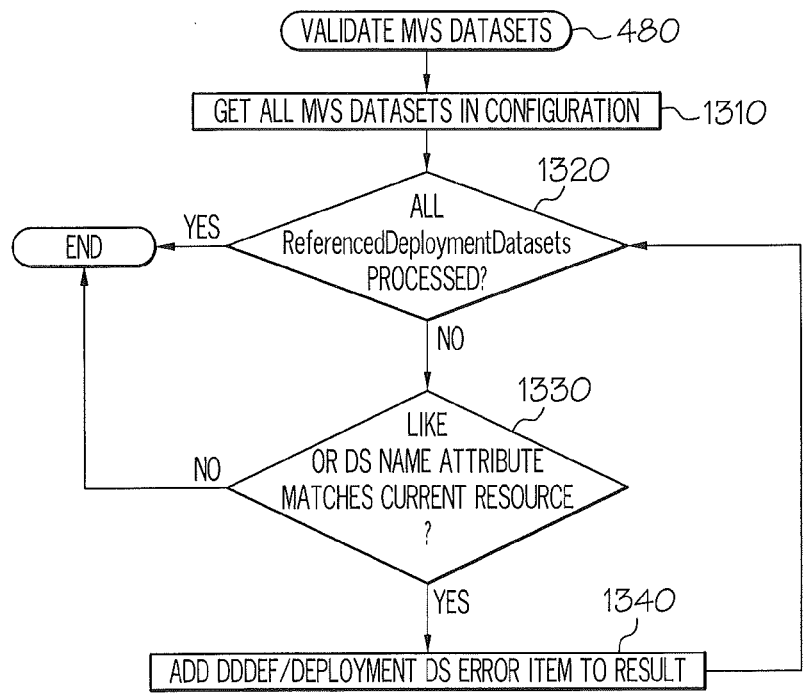

FIG. 13 is a flowchart of operations that may be performed to validate MVS datasets, which may correspond to Block 480 of FIG. 4. MVS datasets are a particular type of resource, so they are obtained at Block 1310 by scanning the configuration and creating a list of MVS dataset resources for later processing. At Block 1320, all the items retrieved at Block 1310 are processed. Each item is compared against all deployment variables in the configuration at Block 1320. If the LIKE or DSNAME attribute in the current resource match values of the deployment variable at Block 1330, then an error is created at Block 1340.

Figure 14:
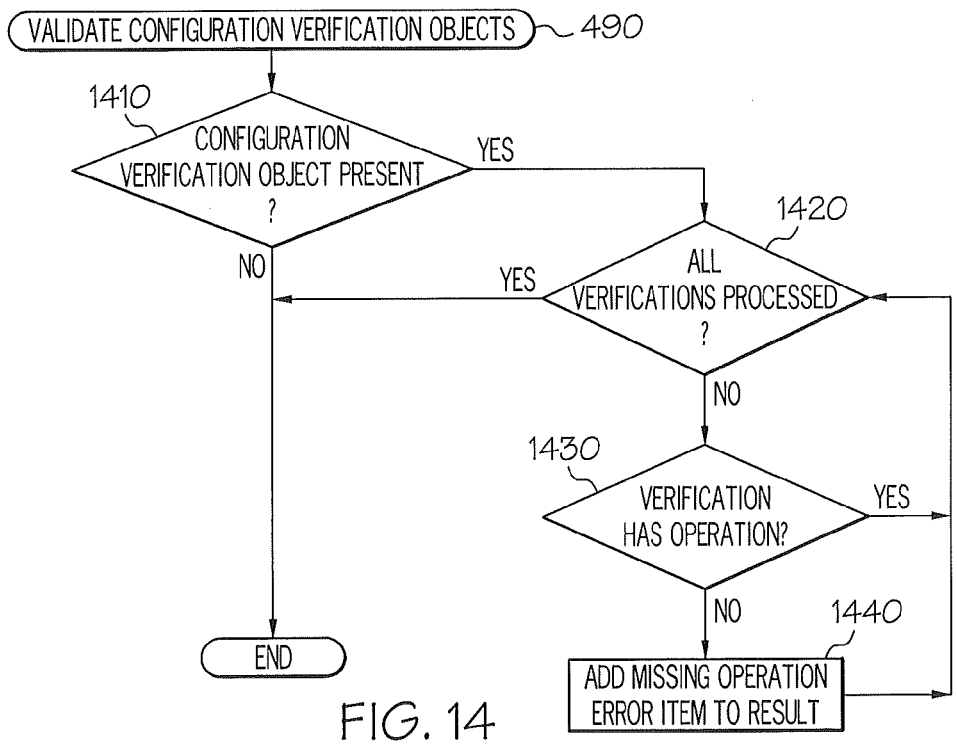

FIG. 14 is a flowchart of operations that may be performed to validate configuration verification objects, which may correspond to Block 490 of FIG. 4. Configuration verifications are optional objects, so a test is made at Block 1410 as to whether configuration objects are present. If yes, then at Block 1420, the configuration verification objects are processed individually. Each configuration object must have a referenced operation, so a test is made at Block 1430. If it does not, then an error is created at Block 1440.

Referring again to FIG. 4, if other types of metadata objects need semantic validation, they may be validated according to their semantic requirements at Block 495.

Schema Validation—Low Level Description

A low level description of schema validation according to various embodiments described herein will now be provided. This low level description will elaborate on Block 520 of FIG. 5, and will then elaborate on Blocks 410-490 of FIG. 4 using specific examples.

FIG. 15 is a flowchart of operations that may be performed to marshall a configuration to a string, which may correspond to Block 520 of FIG. 5. Referring now to FIG. 15, at Block 1502, a test is made as to whether the object is an XML type. An object must conform to JAXB rules, such as it must contain @XML annotations, which are understood by the marshaller. If the object is a valid XML type at Block 1502, then a marshaller is created at Block 1504, a listener is set at Block 1506, an event handler is set at Block 1508 and properties are set at Block 1512. These operations create the objects that are required for marshalling and error reporting. These objects will listen for and store any errors encountered by the marshaller for later use by the application.

At Block 1514, a determination is made as to whether full schema validation is required. If full schema validation is required at Block 1514, i.e., full validation against the XSD files and content checks is required, then the schema is loaded at Block 1516. The schema files are stored in XSD format and contain the rules to which an object must conform to pass schema validation. An example of XSD format will be provided below. If the schema is not being validated, then the schema is set to null at Block 1518.

At Block 1522, a test is made is made as to whether the object is a configuration. If the object is not a configuration, content checking is bypassed and the object is passed to the JAXB marshaller at Block 1526. The content of the non-configuration object can be marshalled but not subjected to the full validation process. This may be used, for example, where the user may want to view an XML snippet of the object in its own context rather than having to scan the entire marshalled document. As the object cannot be created without first creating schema validation, the use of extra checking is not required.

Returning to Block 1522, if the object is a configuration, then before checking against the schema XSDs, checks are made as to the presence of certain objects, such as options (Block 1528), change logs (Block 1534), related FMID (Block 1538) and activation instructions (Block 1544). If they are present but empty (an empty list), then they are set to null at the respective Blocks 1532, 1536, 1542 and 1546. These operations may be performed because many of the list type elements in the metadata builder may have container classes which hold a reference to a list. It is possible that the list may be empty. There may be a policy that requires null entries rather than empty ones, as empty entries can create problems when deployed to the mainframe. At Block 1552, the last modified date is set.

At Block 1554, a test is made as to whether the object is filtered. Filtering means that certain unused elements are removed from the configuration before unmarshalling, as the presence of these elements can cause schema validation errors. Thus, the schema is scanned for these unused elements at Block 1556, and the unused elements are removed at Block 1562.

At Block 1564, the configuration is marshalled. The marshaller class is responsible for governing the process of serializing Java content trees back into XML data. The object and the previously initialized XSD-based schema (Block 1516) is presented to the marshaller. The content is compared to the schema and the errors are encountered are collated and stored in the previously initialized objects (Blocks 1506-1512).

Referring to Block 1566, once the configuration has been marshalled, the configuration is repopulated with any content that was stripped out at Block 1554, so that the configuration is left in a state prior to when the marshalling took place. Thus, if the configuration is filtered at Block 1566, the configuration is converted back at Block 1572. Finally, at Block 1574, the marshalled string is returned to the calling method.

A detailed description of various validation operations that are illustrate in FIG. 4 will now be provided within the context of CA SCS metadata. The following examples shall be regarded as merely illustrative and shall not be construed as limiting the invention.

INTRODUCTION

CA Chorus™ Software Manager (CSM) (formally known as CA Mainframe Software Manager (MSM)) is a product that was implemented in three distinct phases. The first phase of CA CSM delivered an initial set of capacities. These capabilities offer CA customers a new and modern way to obtain, install and maintain their CA products using IBM's SMP/E maintenance product. The second phase implemented techniques that facilitate deploying the SMP/E maintained product target libraries to one or more specified destination systems that are defined to CSM. The third phase focused on providing a modern interface to configuring products that were deployed by CSM.

The following Table 1 shows the components making up CSM and the phase in which each component was included.

TABLE 1

| | |
|---|---|
| Phase 1: | UI—User Interface Framework |
| | PAS—Product Acquisition Service |
| | SIS—Software Installation Service |
| Phase 2: | SDS—Software Deployment Service |
| Phase 3: | SCS—Software Configuration Service |

CSM Metadata:

The Phase 1 CSM implementation required metadata needed by the CSM Software Installation Service (SIS). The SIS metadata is used by SIS processing to automate the SMP/E installation process of CA mainframe products. Each SIS enabled product bundles its software along with the SIS metadata files into a POSIX Portable Archive Exchange (PAX) file. CA CSM SIS processing performs an SMP/E base install of the data provide in the PAX file and as directed by the contents of the SIS metadata.

An additional type of CSM metadata was introduced as part of Phase 2. Unlike SIS metadata, the set of SDS metadata files are considered part of the product software itself and as such are managed by SMP/E. The files making up SDS metadata describe what components of a product are required and which ones are optional. Additionally, SDS metadata identifies which set of SMP/E target libraries are included when CSM deploys the product.

Some CA products are "deployable" while others, in addition to being "deployable", are also "configurable". An optional piece of SDS metadata indicates to CSM if the "deployable" product is "configurable". A third set of CSM metadata is used to define a product that is "configurable". This set is used by CA CSM Software Configuration Service (SCS) to configure an instance of the mainframe product.

The structure of the SCS Metadata will now be described. This structure is defined by a set of schema files. These schema files belong to a family of .xsd files collectively known as the "Mainframe Configuration Descriptor" (MCD). The following list identifies the currently defined set of XML schema files used to define the CSM SCS metadata:

mcd-configurationDescriptor-1.0.xsd
    mcd-environmentProfileDescriptor-1.0.xsd
    mcd-datasetDescriptor-1.0.xsd
    mcd-configurableResoruceDescriptor-1.0.xsd
    mcd-operationDescriptor-1.0.xsd
    mcd-actionDescriptor-1.0.xsd
    mcd-serviceRequestDescriptor-1.0.xsd
    mcd-common-1.0.xsd
    mcd-cdcommon-1.0.xsd
    mcd-cdservice-1.0.xsd CSM XML Instance Documents An XML document that attempts to adhere to an XML schema is said to be an "instance document of that schema". An XML schema describes the structure of an XML instance document by defining what elements the document must or may contain. Additionally, the schema defines the order of where the elements must appear. If the instance document correctly adheres to the schema, the document is considered to be a "valid instance" of that schema.

The content and structure of the set of XML instance documents making up the various CSM metadata files (SIS, SDS and SCS) are defined by the CSM defined XML .xsd schema files described in the previous section.

SIS Instance Documents:

In order for a CA product to be installed using CSM, the product's Electronic Software Delivery (ESD) PAX file must contain a complete set of SIS metadata. This complete set consists of an instance of each of the 5 SIS XML metadata files:

PACKAGE.XML
    DEPLOYMENT.XML
    SMPESETUP.XML
    DATASET.XML
    SMPEINSTALL.XML

CSM SIS processing uses these 5 product-specific instance documents during a SIS Base Install of the product to automatically install that product into a new or existing SMP/E environment.

The set of SIS instance documents contains the data specific to defining how the product should be installed. These files are not imbedded as part of the SMP/E data, but rather are individual files included as separate elements within the PAX file.

SDS Instance Documents:

CSM SDS processing makes use of the following SDS metadata files to identify the required and, if any, optional components of a product. Additionally, SDS metadata files define the set of SMP/E target libraries associated with each defined component. Typically, the base FMID of the product is used as the prefix for each SDS metadata file. An FMID is a 7-character long alpha-numeric string. The eighth and last character is used to identify the purpose of the specific SDS metadata file. Combining the 7-character FMID with the single character suffix allows the files to be uniquely identified when the files are stored into a mainframe partitioned data set. Using the common FMID prefix associates the set of SDS files as belonging to a specific FMID of the product. The set of SDS XML files for a product consists of the following XML instance documents:

a "P" File—a Packaging Descriptor document
a "D" File—a Deployment Descriptor document
a "A" File—a Deployment Actions document
SCS Instance Documents:

Similar the SDS instance documents, SCS XML instance documents are associated with a given product and are managed as SMP/E elements within that product.

There will be a single SCS XML instance document associated with each product FMID for which configuration processing is available. SCS metadata files are typically packaged in the same partitioned data with the SDS metadata files. To ensure it has a unique member name, the last character of an SCS metadata file name end with a letter other than a P, D, and A, as these suffixes are reserved for use by SDS.

Creating SCS instance documents by FMID allows individual configuration definitions associated with an FMID to be updated without affecting other parts of the overall product's configuration (i.e. for those products comprised of two or more FMIDs).

Many products offer features that may be optionally installed and/or optionally included when the product is deployed by CSM SDS. Products having this type of "selectable content" require a product configuration being logically broken up into one or more documents. The set of SCS XML documents assembled to construct a configuration definition is dependent on what part of the product is installed and which parts are subsequently deployed.

A section within the SDS "D" file specifies the order a product's SCS XML instance document(s) are assembled. Additionally, the "D" file identifies which SCS XML instance documents are required and which ones are considered optional.

Figure 16A:
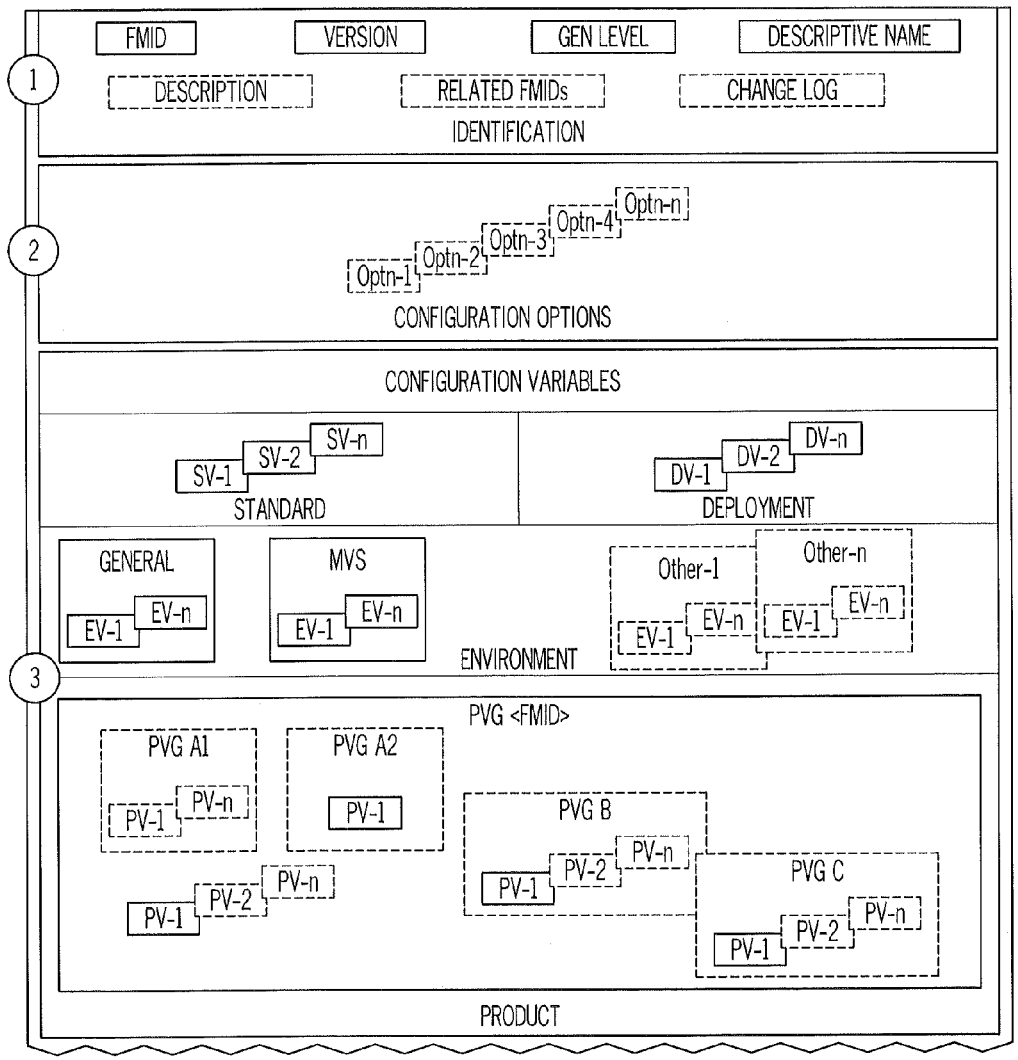
FIGS. 16A and 16B are a block diagram illustrating a logical relationship of high level objects of metadata according to various embodiments described herein.
Figure 16B:
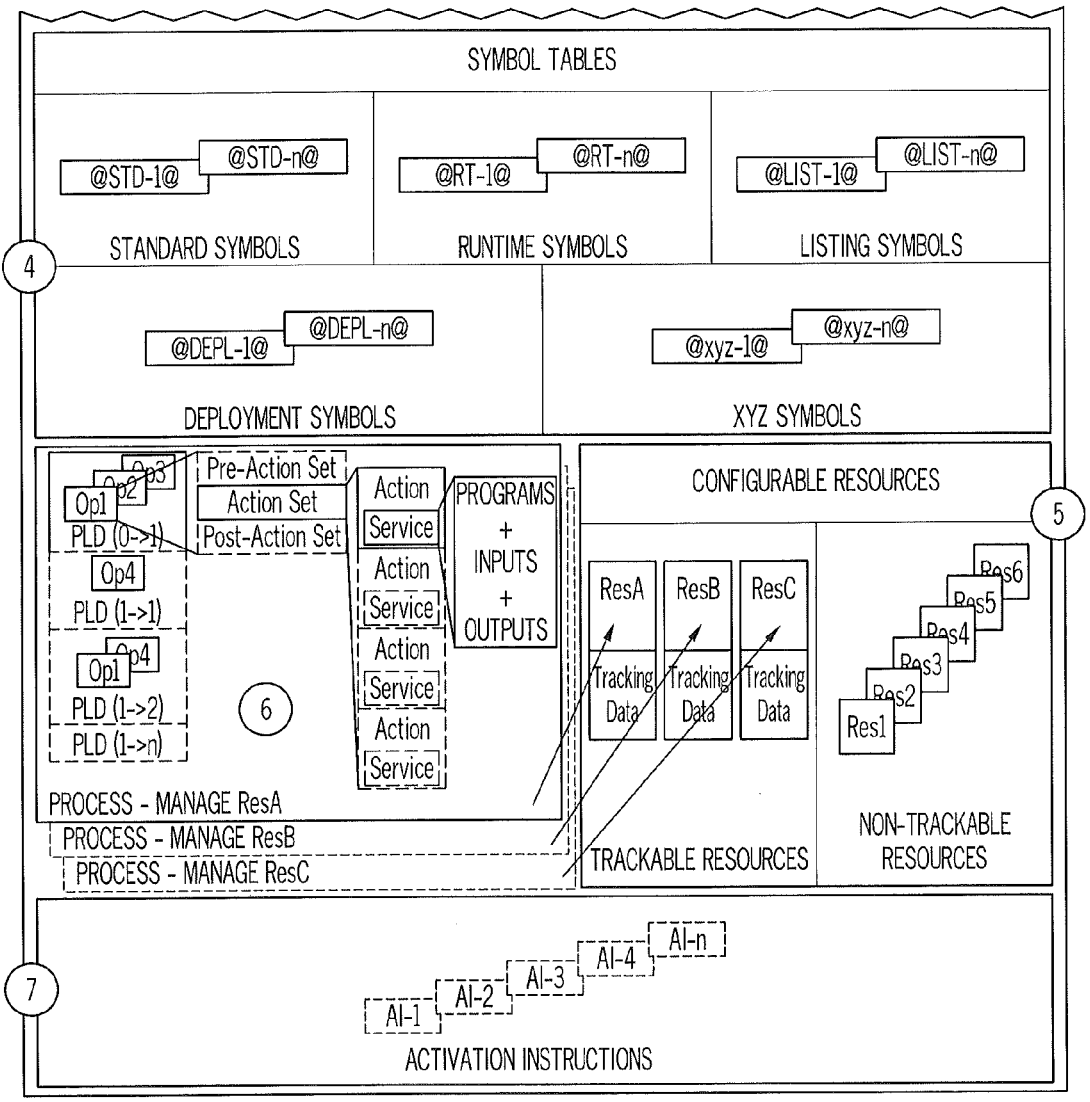

FIGS. 16A and 16B, which will be referred to herein collectively as FIG. 16, portrays the logical relationship of the high-level objects making up an SCS XML instance document (i.e., the XML document created by the MDB).

Each SCS configuration definition is structured in a similar manner. As mentioned above, the composition of a valid SCS instance document must conform to the "Mainframe Configuration Descriptor" (MCD) schema definition.

FIG. 16 is a block diagram of the structure of an SCS instance document. Each SDS document contains the following major sections. The numbers are circled in FIG. 16.

1. Identification
2. Configuration Options
3. Configuration Variables
4. Symbol Tables
5. Configurable Resources
6. Processes
7. Activation Instructions 1—Identification (Block 410 and FIG. 6):

The Identification section of the SCS metadata contains the set of required and optional XML elements needed to identify the configuration definition. Specifically, Identification data includes the following items:

FMID—Specifies the FMID of a product for which the XML document applies.

Version—Over time, as a product matures, the Version ID of the product will likely change. Version associates the SCS instance document to a specific version of the product.

Gen Level—Over time updates to the SCS metadata are expected as maintenance is applied to the product. Gen Level is a value used to distinguish incremental changes of the metadata within an FMID Version.

Descriptive Name—A meaningful name associated with the FMID

Description—(optional) specifies a description for this configuration.

Related FMIDs—(optional) in a multi-FMID configuration, Related FMIDs specifies other FMID that share common Configuration Resource definitions. Also, once a product is configured by CSM its set of "trackable" resources are associated with the FMID which used when the product was originally configured. A product FMID may change over time. Related FMIDs is used to identify any previously configured resources being tracked by CSM for a configured instance of a product.

Change Log—(optional) a historical record used by developers to document the modifications made to the SCS instance document over time.

2—Configuration Options

Typically, a mainframe product is composed of various aspects of its processing that is considered to be required, while other aspects are considered to be optional.

Configuration Options facilitate the ability within an SCS configuration definition to specify optional configuration behavior. Each Configuration Option is effectively a BOOLEAN value, being either TRUE or FALSE. When an option is selected, it has a value of TRUE, if not selected it has a value of FALSE.

Although rare, certain mainframe configuration definitions may not specify any Configuration Options. Therefore, SCS schema definition allows no Configuration Options to be specified in an SCS instance document.

Configuration Options can be defined in the metadata as being "Selected by Default". Doing so indicates that the option is typical for most configurations of the product being defined. A Configuration Option defined as being "Selected by Default" can be unselected by a CSM end user when creating a configuration instance of the product.

Product Configuration Options may be defined as being "Required". A "Required" Configuration Option will be selected by default, but unlike "Selected by Default" a "Required" Configuration Option cannot be unselected.

Additionally, selecting an option can influence the ability to select other options. Specifically, a Configuration Option can be defined as being "Enabled for Selection" only when one or more other Configuration Options are selected. Conversely, a Configuration Option can become "Disabled for Selection" when other specified Configuration Options are Selected. The ability to define "Disabled for Selection" for two or more other Configuration Options allows those options to be processed as being mutually exclusive options. Therefore, for a mutually exclusive Configuration Option to be selected, it cannot be "Disabled for Selection" due to one of the defined "Enabled for Selection" options being selected.

3—Configuration Variables (Block 420 and FIG. 7)

Much of a mainframe product configuration includes variable data which is used to customize its execution within the system it is intended to run.

The customizations include items such as what the product's data sets should be called, what allocations attributes should be used (i.e. UNIT, VOLUME, SMS Classes), if the data sets created by the configuration should be cataloged, and a variety of variables needed to customize JCL, parameter files, environment settings, needed to define the customer's desired intent of how they wish the product to operate in their environment.

To ensure the integrity and conformity of the data being provided, each Configuration Variable has an associated Domain which it defines. Certain domains are used to enforce a specific format and structure, while other domains are more loosely constrained and have only minimum compliance rules. For example, a value of a Configuration Variable that is defined to be a MEMBERNAME must conform to the rules for being a valid member name (uppercase characters, beginning with alphabetic characters, or national characters (@#$), and can be at most 8 characters long). While a value of a Configuration Variable that is defined to be mixed case text can be a string of any length and can contain any mixed case alphabetic, numeric, or special printable character, formatted however the data is entered.

The following Domain types are supported for an SCS Configuration Variable:
 DDNAME
 DSNAME
 DSNAMEWITHGENERATION
 DSNAMEWITHMEMBERNAME
 EXPRESSION
 JOBNAME
 LOWERCASETEXT
 MEMBERNAME
 MIXEDCASETEXT
 NUMERIC
 STRINGEXPRESSION
 UPPERCASETEXT In addition to Domain, each SCS Configuration Variable has to following items:
 name
 maximum length
 description
 tooltip SCS makes use of the following types of Configuration Variables:

Deployment—a set of Deployment Variables (DVs) describe the deployment libraries associated with the product being configured. CSM automatically populates the values associated with each DV with values specific to the deployed target libraries. There is a set of DV variables for each data set deployed for a product. This set of variables includes the data set name, the DASD VOLUME and UNIT the deployed data set resides.

CSM only populates the VOLUME and UNIT variable if the deployment specifies that the deployed data sets be uncataloged. If the deployment processing catalogs the data sets, only the data set name variable will contain a value. If the deployment is to uncataloged data sets, the VOLUME and UNIT variables will contain their respective values of where the deployed data set has been created.

Environment—CSM maintains a System Registry which is made up of settings corresponding to one or more systems. Each system in the CSM System Registry is a potential target system to which a product can be deployed and be subsequently configured. Each system has a set of environment profiles.

The following Table 2 is the list of environment profiles currently defined for each system. The Registry supports two types of profiles, single occurrence profiles and repeated profiles. Single occurrence profiles occur one time for each system, repeated profiles may occur zero or more time per system. The profile names followed by an (R) are "repeated" profile.

TABLE 2

C/C++
CA Chorus (TM)
CA Chorus Platform (R)
CA IDMS_dictionary (R)
CCS
CICS (R)
COBOL
Datacom (R)
DB2 (R)
DB2 Tools
Easytrieve
ENF
General
GTS
IDMS_CV (R)
IMS (R)
IPC
ISPF
JES2
JES3
MIM
MVS
PERMMVSST
PERMOMVSST
PERMVSAMST
PL/I
SYSVIEW
TAPESTORAGE
TCPIP
TEMPMVSST
VTAM By default, each configuration definition includes the General and MVS environment profile. If needed, an SCS configuration definition includes any of the other profiles to reference the Environment Variables (EVs) they contain.

The data associated with referenced EV is used in a configuration to establish the setting corresponding to it value related to the system the product is being configured to run on, or, an EV value can be used to provide the default value for a product variable.

Product—Product variables are a collection of collections. Each collection is referred to as a Product Variable Group (PVG). The root level group is by default assigned to the FMID the SCS XML instance document defines. Each PVG can contain other PVGs. Each PVG contains one or more Product Variables (PVs). A PVG must contain at least one PVG or one PV. In the hierarchical structure of a PVG family: root→a (pvg)→b (pvg)→c (pvg), the lowest level PVG (c) must contain at least one PV. Higher level PVGs (root,a,b) need only contain at least one PVG.

In addition to having an assigned domain and max length, PVs have other characteristics not available to Deployment and Environment variables. Here are the additional items possibly include with each PV as most items are optional:

Optionality—(required) indicates if a value for the PV must be specified (a PV is either mandatory or is optional).

Long Description—(optional) provides an additional text to supplement the content provided in the Description. The text provided by Configuration Variable description is limited to a set size, where a long description can be, as its name implies, as long as is needed to describe the PV, but not exceeding a total length of 508 characters (including XML tags and whitespaces) when the marshaled XML in viewed as a full document, as this will cause a failure when saved to a mainframe.

Default Value—(optional) a value specified with the PV as its initial setting.

Default Set By—(optional) identifies the value to be specified for the PV is obtained using the value associated with another Configuration Variable.

Note: a PV can specifying either a Default Value or a Default Set By, not both. A PV can have only one default setting.

Fixed Value indicator—(optional) makes the PV a constant. The value associated with the PV is provided by the specified Default Value.

User Must Verify—(optional) indicates the value of the PV must be acknowledged by the CSM end user when creating a configuration for the product. CSM provides a "Confirm" button on the UI when presenting a PV that has User Must Verify specified.

Hidden—(optional) specifies the PV is used to hold intermediate values not intended to be seen by the CSM end user. Typically, a PV that is hidden is a variable whose value is composed by combing the values from other PV's.

Permitted Values—(optional) in addition to domain, permitted values specifies additional conformance rules that values specified for the PV must adhere to in order for the specified value to be considered a valid value for the PV. Permitted values include numeric range for PVs belonging to the numeric domain, enumerated lists for PVs belonging to string-based domains, and regular expressions for PVs the need to conform to a specified pattern.

String Expression—(optional) specific to the string based domain types, a String Expression is used to combine PV's into the value of the PV.

Expression—(optional), specific to PV's belonging to the Expression domain, Expression allow other PV's to be used in basic numeric expressions such as SUM, MAX, MIN, * (multiply), / (divide), − (subtract).

Another aspect of Product Variables is they can be included or excluded for a configuration based on the evaluation of a specified Include Condition. An Include Condition is an expression that evaluates to being either TRUE or FALSE. If the specified expression evaluates to TRUE, the associated Product Variable is included in the configuration definition. If the expression evaluates to false, the variable is excluded.

Include Conditions make use of Options, Standard variables, Environment variables, Deployment Variables, and other Product Variables.

Standard—a set of configuration variables common to all SCS configuration definitions. This set of configuration variables support consistent definition and behavior for all SCS configurations. The MDB adds Standard variables to each configuration it creates. CSM treats the Standard set of configuration variables similar to Product Variables. But there definition is determined by the requirement of CSM SCS processing and are not specific to the requirements of the product being defined.

Similar to Product Variables, a CSM end user can set the value for Standard variables the same as they do for PVs, the subtle difference between a Standard variable and a Product variable is that Standard variable are used to direct CSM processing for each product in a consistent manner across all products, where Product variables are specific to each product and the PVs defined will differ from product to product.

4—Symbol Tables (Block 430 and FIG. 8)

Each SCS configuration contains one or more symbol tables. Each symbol table contains one or more symbol definitions. Each symbol is a string of characters and references at most one Configuration Variable. Symbols are used within parts 5 and 6 of the configuration definition (Configurable Resources and Process respectively).

By convention, symbols are decorated in such a manner that they can be easily recognized as being a symbol. In FIG. 16B, each symbol starts and ends with an @ (at sign). A person creating SCS metadata can choose a naming convention for symbols that works best for their respective product.

As shown in the Symbol Tables example in FIG. 16B, only the Standard Symbol table is always included within each SCS instance document. The symbols defined in the Standard Symbol table reference the configuration variables that are define as Standard Variables (SVs).

In addition to the Standard Symbols symbol table, a product configuration definition can have as many or as few symbol tables as make sense for their specific product. In the tables above, the symbol tables other than the Standard Symbols table are shown for illustration purposes only. A typical SCS configuration will have a symbol table to map the Deployment variables and those would be defined in the Deployment Symbols symbol table. Providing a Runtime and Listing Symbols symbol table is also quite common. The names used for these and other Symbol Tables are at the discretion of the person creating the SCS metadata.

Due to the optional and variable nature of the data making up a configuration definition, SCS makes use of symbols to indirectly refer to Configuration Variables. Since each instance of a Configuration Variable must be unique, the string making up a Symbol name on the other hand does not have to be unique. By permitting symbols to have the same name allows a symbol occurrence to be resolved to different values depending on which symbol definition is used to resolve a particular symbol occurrence.

Similar to the Include Condition described above for Product Variables, the inclusion or exclusion of Symbol tables, and Symbols within Symbol Tables can be controlled based on the evaluation of a specified expression. If the specified Include Condition expression evaluates to TRUE the Symbol Table or Symbol is included during CSM symbol substitution processing. If the expression evaluates to FALSE the associated Symbol Table or Symbol is excluded.

Additionally, to limit which symbols will be used during CSM SCS symbol resolution, each configuration definition item that is expected to contain symbols must include as part of its definition an ordered list of Symbol Tables from which the symbols they contain will be processed. Specifying Symbol tables is optional. Therefore, CSM SCS symbol resolution only occurs for configuration definition item that specify at least one Symbol table.

When processing a configuration definition, CSM will resolve any symbol it encounters in the order it is defined. Within each table the symbols are also ordered. CSM will first attempt to resolve symbols from the first specified symbol table, and then once all the symbols in that table have been resolved, it will continue in sequence until all specified symbol tables have been processed. Whenever, CSM discovers a symbol and replaces it with the value of the variable it references, the whole process starts over. Doing so allows the value of a symbol to be replaced with to be another symbol string. The process of symbols substitution continues until all symbols in the specified set of symbol tables have been examined and CSM finds the configuration definition item is fully resolved (i.e. it contains no symbols to replace). CSM works its way resolving symbols for each and every configuration definition that specifies at least one symbol table.

5—Configurable Resources (Block 440 and Figure) and 6—Processes (Block 460 and FIG. 11)

The discussion of Configurable Resources and Processes will be described together rather than as separate discussion items.

CSM SCS processing supports the creation of one or more unique instances of a configured product. Each instance makes use of variable data to distinguish one instance from another. The variable data associated with a product is described by its SCS XML instance document(s), and is used by CSM to obtain the specific value of each variable from a CSM end user, from environment profiles located in the CSM System Registry, and from default values contained within the product's SCS XML document(s).

CSM sees each instance of an SCS configured product as being a collection of "trackable" resources. The level of each "trackable" resource is known to, and is maintained by, CSM. At the time a product configuration is created, CSM assigns the configuration a unique configuration ID value. The configuration ID is used by CSM to associate the collection of "trackable" resources to that specific instance of the configured product. Using unique configuration ID values allows CSM to manage multiple configurations of the same product.

By default, prior to being configured, the level of each "trackable" resource is 0 (zero). In CSM a level of 0 represents a resource that is "unconfigured". Each "trackable" resource defined within the SCS metadata has a non-zero "target" level value. The target-level is what CSM tracks for a resource once that resource is configured. A product is considered to be configured when each of its "trackable" resource is at its defined "target-level".

The SCS metadata defines a Process to manage each "trackable" resource. Each process manages one, and only one "trackable" resource. A process has a set of one or more Process Level Descriptors (PLD) that defines the set of operations needed to take the associated resource from its "current-level" to its defined "target" level. Once the set of operations associate with the PLD complete successfully, CSM updates the level it is keeping track of for that resource to be what is defined as the target-level associated with that "trackable" resources.

Section 5 represents the defined set of "Configurable Resource" associated with a configuration definition. There are two types of "Configurable Resources". The first type, "trackable resources" was described above. It differs from the other type of resource in that it contains "tracking data". Those resources that do not contain "tracking data" are known as "ancillary resource". These resources are used to define the extra resources that are needed by the programs making up the operations defined to configure the "trackable resources". "Ancillary resources" play no meaningful role in representing a completed product configuration and as such are not tracked by CSM.

In FIG. 16B, there are three "trackable resource" and three corresponding processes to manage them, one process for each "trackable resource".

Each process contains one or more Process Level Descriptors (PLD). Each PLD identifies one or more operations. Each operation contains at minimum one Action Set. Optionally, an operation may contain a pre and a post Action Set. The pre and post actions sets allow the configuration to define recovery processing for the associated resource potentially modified by the operation. Typically, the Pre-Action Set defines the actions needed to create a backup of the associated resource. The Post-Action Set defines the actions needed to restore the resource in the event an error in processing occurs.

Each Action Set is made up of one or more Actions. Each Action implements a Service. Currently, CSM SCS supports 26 Service types. In general, a Service is a Program definition made up of a well-defined set of Inputs and Outputs. Each Input and Output is defined using one of the defined "Configurable Resource".

The following is the list of Services supported by CSM SCS and the SCS metadata:
- IBM's IEBCOPY utility
- IBM's IEBGENER utility
- IBM's IEBUPDTE utility
- IBM's Access Method Services (IDCAMS)
- Generic Execute utility
- IBM's Assembler program
- IBM's Binder program
- Create MVS File utility
- Delete MVS File utility
- JES Job Submission utility
- CICS DFHCSDUP utility
- Operator Command utility
- Add LMP Key utility
- Delete LMP Key utility
- Add Auto Command utility (adds commands to CA RIM or ENF auto commands)
- Delete Auto Command utility (remove commands from CA RIM or ENF auto commands)
- Add RIM product utility (adds product information to CAIRIM PARMLIB)
- Delete RIM product utility (remove product information from CAIRIM PARMLIB)
- Add ENF Option utility (adds control options to a CAIENF options data set)
- Delete ENF Option utility (remove control options to a CAIENF options data set)
- Add CCI Spawn Parameters utility (adds CCI spawn parameters to the JCL procedure used to start CAIENF)
- Delete CCI Spawn Parameters utility (removes CCI spawn parameters to the JCL procedure used to start CAIENF)
- Start ENF utility (starts the ENF CA common service)
- Stop ENF utility (stops the ENF CA common service)
- Start Datacom utility (starts a Datacom MUF)
- Stop Datacom utility (stops a Datacom MUF)

As mentioned above, a Process is made up of one or more Process Level Descriptors (PLDs). In general, each PLD define the set of operations needed to take a resource from its current-level to its defined target-level. At minimum, a Process needs to define a PLD that defines how to take its associated unconfigured resource to it defined target-level.

The following are examples of PLD's:
PLD 1—Current-Level=0 to Target-Level=1 (unconfigured to configured)
PLD 2—Target-Level=1 to Target-Level=1 (re-configure)
PLD 3—Target-Level=1 to Target-Level=2 (migrate from Level 1 to 2)
PLD m—Target-Level=m to Target-Level=n (reconfigure if m=n)
PLD n—Target-Level=m to Target-Level=n (migrate if m!=n)

A product may offer the end user a set of Configuration Options that provide variability of what set of resources need to be configured, and those options may influence how certain resources are subsequently configured.

7—Activation Instructions (Block 470 and FIG. 12)

CA CSM 170 Software Configuration Service (SCS) 178 supports two types of configuration processing. The first type enables a "full configuration" of a product such that it is "ready to run". Once each "trackable" resource for the product is configured, the product is then for all intent and purpose "configured". Activation instructions are not used when the end user performs a "full configuration".

The second configuration type supports a two-phase implementation. The first phase creates a customized set of configurable resources, and the second phase activates the configuration. Activation instructions provide a step-by-step description of what an end user would need to do to complete the product configuration such that it is "ready to run".

Allowing a two-phase implementation facilitates the ability to create a set of customized product resources on the system where CSM 170 executes. Optionally, these customized product resources can be transmitted to one or more remote systems 180 at the discretion of the end user. The end user follows the steps described by the activation instructions on each system where the customized resources exist to "activate" the product on each of those systems.

Embodiments of the present disclosure were described herein with reference to the accompanying drawings. Other embodiments may take many different forms and should not be construed as limited to the embodiments set forth herein. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the various embodiments described herein. As used herein, the term "and/or" includes any and all combinations of one or more of the associated listed items.

The terminology used herein is for the purpose of describing particular embodiments only and is not intended to be limiting to other embodiments. As used herein, the singular forms "a", "an" and "the" are intended to include the plural forms as well, unless the context clearly indicates otherwise. It will be further understood that the terms "comprises," "comprising," "includes" and/or "including", "have" and/or "having" when used herein, specify the presence of stated features, integers, steps, operations, elements, and/or components, but do not preclude the presence or addition of one or more other features, integers, steps, operations, elements, components, and/or groups thereof. Elements described as being "to" perform functions, acts and/or operations may be configured to or otherwise structured to do so.

Unless otherwise defined, all terms (including technical and scientific terms) used herein have the same meaning as commonly understood by one of ordinary skill in the art to which various embodiments described herein belong. It will be further understood that terms used herein should be interpreted as having a meaning that is consistent with their meaning in the context of this specification and the relevant art and will not be interpreted in an idealized or overly formal sense unless expressly so defined herein.

As will be appreciated by one of skill in the art, various embodiments described herein may be embodied as a method, data processing system, and/or computer program product. Furthermore, embodiments may take the form of a computer program product on a tangible computer readable storage medium having computer program code embodied in the medium that can be executed by a computer.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computer environment or offered as a service such as a Software as a Service (SaaS).

Some embodiments are described herein with reference to flowchart illustrations and/or block diagrams of methods, systems and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall support claims to any such combination or subcombination.

In the drawings and specification, there have been disclosed typical embodiments and, although specific terms are employed, they are used in a generic and descriptive sense only and not for purposes of limitation, the scope of the disclosure being set forth in the following claims.

What is claimed is:

1. A method of operating a computer system comprising:
semantically validating metadata objects in metadata for a computer program to confirm that required relationship among the metadata objects are present and conform to predefined rules; and
syntactically validating the metadata objects in the metadata for the computer program against a metadata schema for the metadata, wherein the syntactically validating comprises:
scanning the metadata schema for unused elements;
removing the unused elements, wherein removing the unused elements comprises removing the unused elements from a configuration;
marshalling the metadata objects into a string by presenting the metadata schema and the metadata objects to a marshaller, wherein marshalling the metadata objects comprises marshalling the configuration into a string by presenting the metadata schema and the metadata objects to the marshaller;
unmarshalling the string to obtain errors;
collating the errors that are returned by the unmarshalling;
relaying information regarding the errors to a user through a user interface;
after marshalling the metadata objects into a string by presenting the metadata schema and the metadata objects to a marshaller, repopulating the metadata with the unused elements by repopulating the configuration with the unused elements; and
after repopulating the metadata, exporting the metadata objects as a configuration to an external file or uploading the metadata objects as a configuration to a mainframe.

2. The method according to claim 1 wherein the semantically validating comprises:
semantically validating the metadata objects to confirm that data items that identify the metadata are present.

3. The method according to claim 1 wherein the semantically validating comprises:
semantically validating the metadata objects to confirm that variables related to an environment of the metadata and a deployment of the metadata are present.

4. The method according to claim 1 wherein the semantically validating comprises:
semantically validating the metadata objects to confirm that required business objects that contain data that is used by the computer program are present and conform to predefined rules.

5. The method according to claim 1 wherein the semantically validating comprises:
semantically validating the metadata objects to confirm that at least one symbol table for the metadata is present and that each symbol table comprises at least one symbol entry.

6. The method according to claim 1 wherein the semantically validating comprises:
semantically validating the metadata objects to confirm that resources for the metadata are defined consistently.

7. The method according to claim 6 wherein the semantically validating the metadata objects to confirm that resources for the metadata are defined consistently comprises:
confirming that each resource tracking data element has a unique tracking identification; and
confirming that resources do not include mutually exclusive attributes or instructions.

8. The method according to claim 1 wherein the semantically validating comprises:
semantically validating the metadata objects to confirm that processes comprise resource tracking identifications and process level descriptors.

9. The method according to claim 1 wherein the semantically validating comprises:
semantically validating the metadata objects to confirm that data items that identify the metadata are present;
semantically validating the metadata objects to confirm that variables related to an environment of the metadata and a deployment of the metadata are present;

semantically validating the metadata objects to confirm that at least one symbol table for the metadata is present and that each symbol table comprises at least one symbol entry;

semantically validating the metadata objects to confirm that resources for the metadata are defined consistently; and semantically validating the metadata objects to confirm that processes comprise resource tracking identifications and process level descriptors.

10. The method of claim 1, wherein semantically validating comprises semantically validating by a processor of the computer system, and wherein syntactically validating comprises syntactically validating by the process of the computer system.

11. A computer system comprising:
a processor; and
a metadata validating system that runs on the processor and is configured to perform operations comprising:
semantically validating metadata objects in metadata for a computer program to confirm that required relationships among the metadata objects are present and conform to predefined rules; and
syntactically validating the metadata objects in the metadata for the computer program against a metadata schema for the metadata, wherein the syntactically validating comprises:
scanning the metadata schema for unused elements;
removing the unused elements from the metadata schema, wherein removing the unused elements comprises removing the unused elements from a configuration;
marshalling the metadata objects into a string by presenting the metadata schema and the metadata objects to a marshaller, wherein marshalling the metadata objects comprises marshalling the configuration into a string by presenting the metadata schema and the metadata objects to the marshaller;
unmarshalling the string to obtain errors;
collating the errors that are returned by the unmarshalling;
relaying information regarding the errors to a user through a user interface;
after marshalling the metadata objects into a string by presenting the metadata schema and the metadata objects to a marshaller, repopulating the metadata with the unused elements by repopulating the configuration with the unused elements; and after repopulating the metadata, exporting the metadata objects as a configuration to an external file or uploading the metadata objects as a configuration to a mainframe.

12. The computer system according to claim 11 wherein the semantically validating comprises:
semantically validating the metadata objects to confirm that data items that identify the metadata are present.

13. The computer system according to claim 11 wherein the semantically validating comprises:
semantically validating the metadata objects to confirm that variables related to an environment of the metadata and a deployment of the metadata are present.

14. The computer system according to claim 11 wherein the semantically validating comprises:
semantically validating the metadata objects to confirm that required business objects that contain data that is used by the computer program are present and conform to predefined rules.

15. A method of operating a compute system comprising:
semantically validating, by a processor of the computer system, metadata objects in metadata for a computer program to confirm that required relationships among the metadata objects are present and conform to predefined rules; and
syntactically validating, by the processor of the computer system, the metadata objects in the metadata for the computer program against a metadata schema for the metadata, wherein the syntactically validating comprises:
scanning the metadata schema for unused elements;
removing the unused elements from a configuration;
marshalling the configuration into a string by presenting the metadata schema and the metadata objects to a marshaller;
unmarshalling the string to obtain errors;
collating the errors that are returned by the unmarshalling;
relaying information regarding the errors to a user through a user interface;
after marshalling, repopulating the configuration with the unused elements; and
after repopulating the configuration, exporting the configuration to an external file or uploading the configuration to a mainframe.

16. The method of claim 15, wherein semantically validating comprises semantically validating by a processor of the computer system, and wherein syntactically validating comprises syntactically validating by the processor of the computer system.

* * * * *